United States Patent
Xie et al.

(10) Patent No.: US 11,531,697 B2
(45) Date of Patent: Dec. 20, 2022

(54) IDENTIFYING AND PROVIDING DIGITAL IMAGES DEPICTING HUMAN POSES UTILIZING VISUAL INTERACTIVE CONTENT SEARCH AND VIRTUAL MANNEQUINS

(71) Applicant: Adobe Inc., San Jose, CA (US)

(72) Inventors: Jinrong Xie, Sunnyvale, CA (US); Shabnam Ghadar, Menlo Park, CA (US); Jun Saito, Seattle, WA (US); Jimei Yang, Merced, CA (US); Elnaz Morad, San Jose, CA (US); Duygu Ceylan Aksit, Mountain View, CA (US); Baldo Faieta, San Francisco, CA (US); Alex Filipkowski, San Francisco, CA (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 17/087,982

(22) Filed: Nov. 3, 2020

(65) Prior Publication Data
US 2022/0138249 A1   May 5, 2022

(51) Int. Cl.
*G06F 16/55*   (2019.01)
*G06F 16/538*   (2019.01)
(Continued)

(52) U.S. Cl.
CPC ............ *G06F 16/55* (2019.01); *G06F 16/535* (2019.01); *G06F 16/538* (2019.01); *G06F 16/56* (2019.01);
(Continued)

(58) Field of Classification Search
CPC .... G06F 16/55; G06F 16/5854; G06F 16/538; G06F 16/535; G06F 16/56
(Continued)

(56) References Cited

U.S. PATENT DOCUMENTS 9,940,577 B2 *   4/2018   Jin ..................... G06K 9/6218
10,163,003 B2 *  12/2018  Chen ..................... G06T 7/73
(Continued)

OTHER PUBLICATIONS

Al-Hami, Motaz. "Reconstructing 3D Human Poses from Keyword Based Image Database Query." Jul. 14, 2018. https://www.researchgate.net/publication/32563820 (Year: 2018).*
(Continued)

*Primary Examiner* — Kimberly L Wilson
(74) *Attorney, Agent, or Firm* — Keller Preece PLLC

(57) ABSTRACT

The present disclosure relates to systems, methods, and non-transitory computer readable media for accurately, efficiently, and flexibly identifying and providing digital images of human figures in poses corresponding to a query pose. In particular, the disclosed systems can provide multiple approaches to searching for and providing pose images, including identifying a digital image depicting a human figure in a particular pose based on a query digital image that depicts the pose or identifying a digital image depicting a human figure in a particular pose based on a virtual mannequin. Indeed, the disclosed systems can provide a manipulable virtual mannequin that defines a query pose for searching a repository of digital images. Additionally, the disclosed systems can generate and provide digital pose image groups by clustering digital images together according to poses of human figures within a pose feature space.

20 Claims, 19 Drawing Sheets

(51) Int. Cl.
- *G06F 16/583* (2019.01)
- *G06F 16/56* (2019.01)
- *G06F 16/535* (2019.01)
- *G06N 3/08* (2006.01)
- *G06T 7/73* (2017.01)

(52) U.S. Cl.
CPC ........... *G06F 16/5854* (2019.01); *G06N 3/08* (2013.01); *G06T 7/74* (2017.01)

(58) Field of Classification Search
USPC ........................................................ 707/737
See application file for complete search history.

(56) References Cited

U.S. PATENT DOCUMENTS

| | | | | |
|---|---|---|---|---|
| 11,074,717 | B2 * | 7/2021 | Tremblay | G06N 3/0454 |
| 11,176,189 | B1 * | 11/2021 | Hohwald | G06F 16/5866 |
| 11,238,650 | B2 * | 2/2022 | Li | G06T 7/50 |
| 2011/0184953 | A1 * | 7/2011 | Joshi | G06V 10/464 |
| | | | | 707/738 |
| 2013/0230211 | A1 * | 9/2013 | Tanabiki | G06V 40/23 |
| | | | | 382/103 |
| 2015/0302505 | A1 * | 10/2015 | Di | G06Q 30/0631 |
| | | | | 705/26.7 |
| 2016/0350336 | A1 * | 12/2016 | Checka | G06F 16/5866 |
| 2017/0154208 | A1 * | 6/2017 | Zhang | G06V 40/161 |
| 2019/0286892 | A1 * | 9/2019 | Li | G06V 10/82 |
| 2021/0049811 | A1 * | 2/2021 | Fedyukov | G06T 17/00 |
| 2021/0064612 | A1 * | 3/2021 | Huang | G06F 16/3329 |

OTHER PUBLICATIONS

Cao, Zhe et al.; OpenPose: Realtime Multi-Person 2D Pose Estimation using Part Affinity Fields : May 30, 2019; https://arxiv.org/pdf/1812.08008.pdf.

Szegedy, Christian et al.; "Going Deeper with Convolutions"; Computer Vision and Pattern Recognition (CVPR) (2015); This CVPR2015 paper is the Open Access version, provided by Computer Vision Foundation.

J. Martinez, R. Hossain, J. Romero and J. J. Little, "A Simple Yet Effective Baseline for 3d Human Pose Estimation," 2017 IEEE International Conference on Computer Vision (ICCV), Venice, 2017, pp. 2659-2668.

* cited by examiner

IDENTIFYING AND PROVIDING DIGITAL IMAGES DEPICTING HUMAN POSES UTILIZING VISUAL INTERACTIVE CONTENT SEARCH AND VIRTUAL MANNEQUINS

BACKGROUND

The field of digital image search and response has seen a variety of recent technical advances. For example, engineers have developed computer-implemented artificial intelligence algorithms that allow conventional systems to identify digital images that match digital queries. To illustrate, some conventional digital image search systems can receive a digital keyword or description and identify digital images that portray digital content that reflects the keyword or description. However, while some conventional systems can identify digital images showing digital content, these conventional systems suffer from a number of disadvantages, particularly with regard to the accuracy, efficiency, and flexibility in conducting digital image searches for specific human body configurations.

To illustrate, many conventional digital image search systems generate inaccurate responses for search queries corresponding to a particular body pose. In particular, because many conventional systems generate query responses based solely on keyword queries, the resultant query responses often do not portray a precise body configuration. Indeed, because specific poses are not easily described by verbal descriptions, conventional systems provide inaccurate and imprecise responses. Further, query responses of conventional systems are generally only as accurate as the pose labels of digital images they search. Such labels are frequently incomplete or even incorrect. As a result, conventional systems often provide inaccurate query responses including digital images that are not representative of an intended or a desired query.

Due at least in part to their inaccuracy in generating query responses, many conventional digital image search systems are also inefficient. More specifically, many conventional systems generate and provide inefficient user interfaces that require excessive user interactions to access desired data and/or functionality. To elaborate, because conventional systems generate query responses that do not include accurate matches, conventional systems often require large numbers of navigational inputs to locate desired digital images within a query response. In many cases, conventional systems also require repeat searches, with new keyword query entries each time, before generating a query response with a desired digital image. By requiring such a high volume of user interaction, conventional systems often consume excessive computing resources such as processing time, processing power, and memory in processing the user interactions and performing the corresponding operations.

As suggested above, conventional digital image search systems are not only inaccurate and inefficient, but also inflexible. Specifically, many conventional systems rigidly restrict searching input to a particular input mode, such as a keyword search. Thus, conventional systems are rigid and inflexible in defining the bounds of a digital image search. The rigid nature of conventional systems is especially apparent when searching for digital images with particular body poses, where differences may be minute and difficult to describe with the inflexible input options provided.

Thus, there are several disadvantages with regard to conventional digital image search systems.

SUMMARY

One or more embodiments described herein provide benefits and solve one or more of the foregoing or other problems in the art with systems, methods, and non-transitory computer readable media that accurately, efficiently, and flexibly identify and provide digital images portraying human figures in poses corresponding to a query pose. In particular, in one or more embodiments the disclosed systems provide multiple dynamic approaches to search for and provide digital images portraying specific human body configurations via a graphical user interface. Indeed, in one or more implementations the disclosed systems provide user interfaces and utilize corresponding machine learning models for reference pose digital image searching, virtual mannequin digital image searching, and pose cluster representation image searching (in conjunction with other search modalities such as keyword search inputs).

For example, in some embodiments, the disclosed systems identify a reference digital image as part of a digital image query. In response, the disclosed systems process the reference digital image utilizing a pose neural network to identify a query pose portrayed in the digital image and then search for matching digital images portraying the same query pose. In addition, in one or more embodiments the disclosed systems provide a two-dimensional (or three-dimensional) virtual mannequin for display via a graphical user interface. Based on user interaction with the graphical user interface, the disclosed systems process different configurations of joints and limbs of the virtual mannequin to identify and provide matching pose digital images. Furthermore, in one or more embodiments the disclosed systems generate and provide representative images from digital pose image groups by analyzing a repository of digital images utilizing a pose neural network and then clustering the digital images within a pose feature space.

Thus, the disclosed systems can flexibly apply multiple search approaches—including query pose images, virtual mannequins, virtual clustering, and keyword search—to generate accurate digital image search results. In this manner, the disclosed systems can efficiently and flexibly identify digital images portraying poses that accurately align to specific pose queries.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
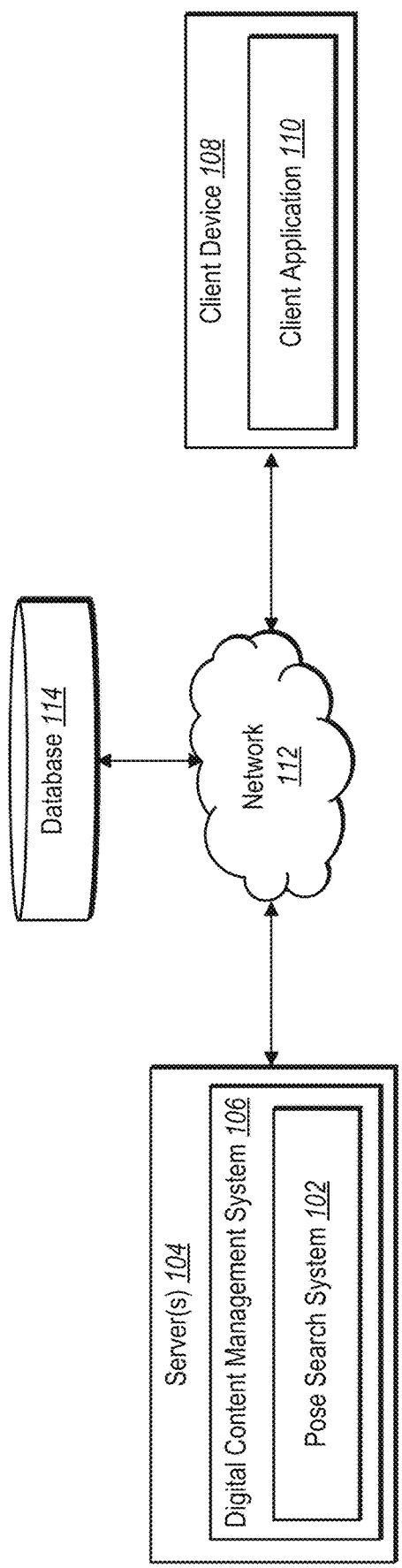
FIG. 1 illustrates an example system environment in which a pose search system operates in accordance with one or more embodiments.

One or more embodiments described herein include a pose search system that accurately, efficiently, and flexibly identifies and provides digital images depicting human figures with body configurations that align to particular query poses. For example, the disclosed systems utilize a pose neural network to identify and provide digital images based on a query pose portrayed in a query digital image, based on a configuration of a 2D or 3D virtual mannequin, and/or based on digital pose image groups within a pose feature space. In some embodiments, the disclosed systems also flexibly utilize these search approaches in conjunction with other input modalities, such as keyword search to flexibly and efficiently generate accurate digital image query responses.

To illustrate, in one or more embodiments the pose search system utilizes a pose neural network to identify a query pose from a digital image depicting a human figure. The pose search system then utilizes the pose neural network to search a repository of digital images and identify digital images depicting human figures in poses corresponding to the query pose. Moreover, in some embodiments the pose search system generates and provides a virtual mannequin with manipulable joints and segments for positioning into a query pose for identifying digital images. In some cases, the pose search system extracts a query pose from the digital mannequin and utilizes a pose neural network to search for digital images portraying matching poses. Furthermore, in one or more embodiments the pose search system generates digital pose image groups by processing digital images utilizing a pose neural network and clustering the digital images within a pose prior space. In some implementations, the pose search system surfaces representative poses from these digital pose image clusters in response to digital queries.

The pose search system can utilize these search approaches in a variety of different combinations (or in conjunction with other search modalities, such as keyword search). For example, the pose search system identifies digital images by first conducting a query pose search based on a reference digital image and then refining this search utilizing a virtual mannequin. In some cases, the pose search system utilizes keyword search inputs in conjunction with a reference digital image to identify matching digital images (e.g., identify digital images that portray a keyword and the query pose extracted from the image). Moreover, in certain described embodiments, the pose search system utilizes keyword searches in conjunction with a virtual mannequin (e.g., identify digital images that portray a keyword and a query pose extracted from the virtual mannequin configuration) and/or in conjunction with pose image groups (e.g., cluster digital images portraying keywords in a pose prior space and surface representative digital images from pose clusters that also portray the keywords).

As mentioned, in one or more embodiments the pose search system identifies digital images depicting human figures in various poses from a digital image repository. For example, to identify digital images depicting human figures in a query pose, the pose search system processes the digital images within a digital image repository to determine candidate digital poses of human figures depicted within the digital images. For instance, the pose search system utilizes a pose neural network to identify joint locations and segment arrangements of human figures within the digital images to determine the candidate digital poses. In some implementations, the pose search system utilizes the candidate digital poses as a basis for comparing against a query pose and identifying matching digital images.

As discussed above, in some embodiments the pose search system receives a digital image query that includes an indication of a digital image defining a query pose. In one or more embodiments, the pose search system determines the query pose from the digital image by analyzing a human figure within the digital image to identify joint locations and segment arrangements of the human figure. For example, the pose search system utilizes a pose neural network to determine the query pose of the digital image for the digital image query. In some embodiments, the pose search system then compares the query pose with candidate digital poses to identify digital images depicting human figures in (or within a threshold similarity of) the query pose.

In addition, in some embodiments, the pose search system identifies a digital image query that includes a keyword query and a digital image defining a query pose. In such circumstances, the pose search system identifies digital images depicting human figures matching the query pose and also depicting digital content reflecting a keyword query. For example, in response to a keyword query of "woman yoga," the pose search system identifies digital images depicting women and yoga. From the digital images depicting this digital content, the pose search system further identifies those digital images that depict human figures in the query pose portrayed in the reference digital image.

As mentioned above, in one or more embodiments the pose search system also provide a virtual mannequin for searching digital images portraying a query pose. For example, in some embodiments the pose search system receives a reference digital image from a client device and determines a pose of a human figure shown in the selected digital image. The pose search system generates and provides a virtual mannequin with manipulable joints and segments in the determined pose.

In some embodiments, the pose search system receives user interaction in relation to a two-dimensional virtual mannequin to define a query pose from the virtual mannequin. For instance, the pose search system receives user interaction to modify a joint and/or a segment of the virtual mannequin. Based on the modification, the pose search system identifies a query pose from the joints and segments and then searches for and identifies digital images depicting human figures in the query pose of the modified virtual mannequin. To illustrate, in some cases, the pose search system utilizes a 2D-to-3D neural network to generate a three-dimensional query pose from a two-dimensional query pose of the virtual mannequin.

As mentioned above, in some embodiments the pose search system generates and provides a three-dimensional virtual mannequin. For example, the pose search system provides a three-dimensional virtual mannequin with three-dimensional controls to modify joints and segments in three-dimensional space and/or a reference viewing angle of the three-dimensional virtual mannequin. In some embodiments, the pose search system detects user interaction with the three-dimensional virtual mannequin, determines a query pose (e.g., including a query viewing angle) and identifies matching digital images. For example, to generate a query response based on a three-dimensional query pose indicated by a three-dimensional virtual mannequin, the pose search system determines three-dimensional candidate digital poses (e.g., utilizing the 2D-to-3D neural network) of digital images within a digital image repository. In some embodiments, the pose search system compares the three-dimensional candidate digital poses with the three-dimensional query pose to identify digital images to provide within a query response.

In one or more embodiments, the pose search system generates digital pose image clusters in response to a digital image query (e.g., in response to a keyword query and/or a query pose from a digital image or a virtual mannequin). For instance, in response to a keyword query, the pose search system identifies a subset of digital images depicting digital content that reflects the keyword query. Additionally, the pose search system utilizes a poses neural network to extract pose vectors for this subset of digital images and maps the pose vectors to a pose feature space. In some cases, the pose search system clusters these pose vector into digital pose image groups within the pose feature space and then surfaces representative poses from the clusters. For example, in response to a keyword query, the pose search system provides representative images from the pose image groups to further refine the keyword query to a particular pose.

As suggested above, embodiments of the pose search system provide several advantages over conventional digital image search systems. For example, the pose search system can improve accuracy relative to conventional systems. In particular, while many conventional systems rely on keyword queries alone, embodiments of the pose search system generate more accurate query responses by utilizing search approaches that are more precise and tailored to identifying particular body configurations. Indeed, the pose search system can more accurately identify matching digital images by processing reference digital images, extracting query poses from a virtual mannequin, or searching representative poses from pose image groups. Thus, even given the limitations of keywords or labels in describing body configurations, the pose search system can accurately identify digital images depicting a query pose.

Due at least in part to its improved accuracy, embodiments of the pose search system further provide improved efficiency over many conventional digital image search systems. As opposed to many conventional systems that require large numbers of user interactions to locate desired digital pose images, embodiments of the pose search system generate and provide more efficient user interfaces that require fewer user interactions to locate the desired digital images. For instance, rather than requiring numerous scrolling actions and/or multiple successive keyword queries to narrow a pose search, the pose search system provides a virtual mannequin that is manipulable to quickly locate digital images exhibiting a precise pose. Similarly, the pose search system can provide user interface elements with representative pose digital images from pose image groups and user interface options for selecting representative digital images portraying a query pose. Thus, compared to conventional systems, the pose search system can utilize fewer computing resources such as processing time, processing power, and memory in processing user interactions and the operations that result from the user interactions.

As suggested above, embodiments of the pose search system further provide improved flexibility over conventional digital image search systems. Indeed, unlike many conventional systems that restrict pose searching to keyword queries, the pose search system can flexibly provide a wide array of pose searching tools. For example, the pose search system searches for digital pose images based on a query digital image that depicts a human figure in a query pose. As another example, the pose search system provides a virtual mannequin that is manipulable to define a query pose for identifying digital images corresponding to the query pose. Similarly, the pose search system can provide representative digital images from pose image groups to assist in flexibly identifying digital images portraying target poses. The flexibility of these search tools is especially salient in providing for more granular, more precise poses that are difficult (or impossible) to describe with words alone.

As suggested by the foregoing discussion, this disclosure utilizes a variety of terms to describe features and benefits of the pose search system. Additional detail is hereafter provided regarding the meaning of these terms as used in this disclosure. In particular, the term "digital image query" refers to a request for digital images. For example, a digital image query includes a request to search a repository of digital images to identify digital images depicting digital content (e.g., digital content reflecting a keyword and/or depicting human figures in certain poses). In some cases, a digital image query includes a keyword query and/or digital image depicting a human figure. As used herein, the term "keyword query" refers to a request for digital images that includes a string of characters. In particular, a keyword query includes a request to search digital images corresponding to keywords included in the keyword query. For example, a keyword query prompts the pose search system to search for digital images that include or portray digital content indicated by the keyword query. In some cases, a keyword query corresponds to labels associated with digital images that indicate the digital content shown in the digital images.

In some embodiments, the pose search system determines a query pose from a digital image to use as basis for searching for digital images matching the query pose. As used herein, the term "pose" refers to configuration of a body. In particular, a pose includes an arrangement of joints and/or segments connecting joints (e.g., of a human figure or a virtual mannequin). In some embodiments, a pose includes a visible depiction of joints and segments, while in other cases, a pose includes a computerized representation of joint locations and/or segment locations. In certain cases, a pose includes an abstract representation of joint locations and/or segment locations using vectors or other feature (e.g., deep feature) representations in a pose feature space or a pose prior space.

Relatedly, the term "query pose" refers to a pose corresponding to a request for a digital image. In particular, a query pose includes a pose sought in a search of digital images. Thus, a query pose includes a pose that is part of a search for digital images (e.g., a search for digital images human figures in poses corresponding to the query pose). For instance, a query pose includes a pose of a human figure shown in a digital image or a pose of a virtual mannequin that includes manipulable joints and segments. In some cases, the pose search system determines a query pose to use as a basis for a digital image search from a selected digital image or from an arrangement of joints and segments of a virtual mannequin.

In some embodiments, the pose search system determines candidate digital poses of digital images within a digital image repository to compare with a query pose. As used herein, the term "candidate digital pose" refers to a pose associated with a digital image from a repository of digital images. For example, a candidate digital pose includes a pose that is considered, analyzed, or compared in searching for a match with a query pose. Indeed, the pose search system compares a candidate digital pose with a query pose to determine a measure of similarity between the two poses.

To determine a query pose and/or a candidate digital pose, in one or more embodiments, the pose search system utilizes a pose neural network. The term "neural network" refers to a machine learning model that is trained and/or tuned based on inputs to determine classifications or approximate unknown functions. For example, the term neural network includes a model of interconnected artificial neurons (e.g., organized in layers) that communicate and learn to approximate complex functions and generate outputs based on a plurality of inputs provided to the neural network. In some cases, a neural network refers to an algorithm (or set of algorithms) that implements deep learning techniques to model high-level abstractions in data. For example, a neural network includes a convolutional neural network, a recurrent neural network (e.g., an LSTM neural network), a graph neural network, or a generative neural network.

As used herein, the term "pose neural network" refers to a neural network trained or tuned to identify poses. For example, a pose neural network determines a pose of a digital image by processing the digital image to identify locations and arrangements of joints and segments of a human figures portrayed in the digital image. As another example, the pose neural network determines a pose of a virtual mannequin by processing the virtual mannequin to identify locations of joints and segments of the virtual mannequin. Additional detail architecture of a pose neural network is provided in greater detail below.

As used herein, the term "human figure" refers to a likeness, a depiction, or a portrayal of a human or humanoid shape within a digital image. For example, a human figure includes a captured depiction of an actual person within a digital image, a drawing of a human shape in a digital image, a cartoon portrayal of a human character in a digital image, or some other humanoid shape in a digital image such as a human-shaped machine, creature, stick-figure, or other resemblance. In some cases, a human figure includes one or more arms, one or more legs, a torso, and a head. Although many example embodiments described herein include human figures, the pose search system can also operate with regard to other body figures (e.g., poses corresponding to different animal figures). Thus, for example, the pose search system can search for pets (e.g., dogs, snakes, or spiders) having poses corresponding to a reference digital image or a virtual mannequin (e.g., an animal virtual mannequin).

In some embodiments, the pose search system implements additional neural networks such as a 2D-to-3D neural network for generating three-dimensional poses from two-dimensional poses of human figures or a virtual mannequin. As used herein, the term "2D-to-3D neural network" refers to a neural network that process two-dimensional information to generate or extract three-dimensional information. For example, a 2D-to-3D neural network includes a neural network that extracts three-dimensional coordinates from two-dimensional coordinates by projecting coordinates within a unit sphere.

As mentioned, in certain embodiments, the pose search system generates a query response to provide in response to a digital image query. As used herein, the term "query response" refers to a set of one or more digital images provided in response to a digital image query. For example, a query response includes digital images that depict digital content reflecting a keyword query and that depict human figures in poses similar to a query pose. Indeed, the pose search system generates and provides a query response for display on a client device based on receiving a digital image query that includes a keyword query and/or a query pose (e.g., determined from a digital image or a virtual mannequin).

As also mentioned, in some embodiments, the pose search system generates and provides a virtual mannequin for display on a client device. As used herein, the term "virtual mannequin" refers to a digital representation of a figure, body or form, including manipulable joints and manipulable segments (e.g., a human figure). For example, a virtual mannequin includes a digital representation of joints and segments corresponding to a human form (e.g., dots representing joint locations and linear members connecting the dots representing segments). In one or more embodiments, the pose search system generates a "three-dimensional virtual mannequin," which refers to a virtual mannequin with joint positions and/or segment arrangements in three dimensions. For instance, the pose search system adjusts not only joints and segments of a three-dimensional virtual mannequin in three dimensions, but also a viewing angle associated with the three-dimensional virtual mannequin.

Relatedly, a "joint" refers to an endpoint of a segment of a depicted human figure or a virtual mannequin. For instance, a joint refers to a location where two or more segments connect. In some embodiments, a joint includes a location where segments rotate, pivot, or otherwise move in relation to one another. In some cases, a joint includes a computerized or abstract vector representation of a location corresponding to a joint of depicted human figure or a virtual mannequin.

Along these lines, a "segment" refers to a representation or depiction of a rigid length or portion of a human figure or a virtual mannequin. In some embodiments, a segment refers to a line or other connector between joints of a depicted human figure or a virtual mannequin. For example, a segment represents an upper arm between a shoulder joint and an elbow joint, a forearm between an elbow joint and a wrist joint, or an upper leg between a hip joint and a knee joint. In some cases, a segment includes a computerized or abstract vector representation of a line or connecting component between two joint locations of a depicted human figure or a virtual mannequin.

In some embodiments, the pose search system generates (e.g., as part of a query response) a digital pose image group that includes one or more digital images depicting human figures with similar poses. As used herein, the term "digital pose image group" refers to a set of one or more digital images depicting human figures (e.g., with poses that are within a threshold similarity of each other). For example, a digital pose image group includes a plurality of digital images whose pose vectors are within a threshold distance of each other (or from a cluster center) within a pose feature space.

Additional detail regarding the pose search system will now be provided with reference to the figures. For example, FIG. 1 illustrates a schematic diagram of an example system environment for implementing a pose search system 102 in accordance with one or more embodiments. An overview of the pose search system 102 is described in relation to FIG. 1. Thereafter, a more detailed description of the components and processes of the pose search system 102 is provided in relation to the subsequent figures.

As shown, the environment includes server(s) 104, a client device 108, a database 114, and a network 112. Each of the components of the environment communicate via the network 112, and the network 112 is any suitable network over which computing devices communicate. Example networks are discussed in more detail below in relation to FIG. 17.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 17. Although FIG. 1 illustrates a single client device 108, in some embodiments the environment includes multiple different client devices, each associated with a different user (e.g., a digital image editor). The client device 108 communicates with the server(s) 104 via the network 112. For example, the client device 108 receives user input from a user interacting with the client device 108 (e.g., via the client application 110) to, for instance, search for and/or select digital images depicting human figures in various poses. Thus, the pose search system 102 on the server(s) 104 receives information or instructions to generate a query result based on a digital image query from a digital image repository stored within the database 114.

As shown, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. The client application 110 presents or displays information to a user, including a digital image search interface including a keyword query bar, a selected digital image, a virtual mannequin, and/or a query response including one or more digital images from a digital image repository. A user interacts with the client application 110 to provide user input to perform operations as mentioned above, such as providing a keyword query, selecting a digital image, and/or manipulating a virtual mannequin.

As illustrated in FIG. 1, the environment includes the server(s) 104. The server(s) 104 generates, tracks, stores, processes, receives, and transmits electronic data, such as a digital image queries, virtual mannequins, and query responses. For example, the server(s) 104 receives data from the client device 108 in the form of a digital image query to identify digital images depicting human figures in a particular query pose. In addition, the server(s) 104 transmits data to the client device 108 to provide a query response that includes digital images portraying human figures in the query response (or in poses within a threshold similarity of the query response). Indeed, the server(s) 104 communicates with the client device 108 to transmit and/or receive data via the network 112. In some embodiments, the server(s) 104 comprises a distributed server where the server(s) 104 includes a number of server devices distributed across the network 112 and located in different physical locations. The server(s) 104 comprises a content server, an application server, a communication server, a web-hosting server, a multidimensional server, or a machine learning server.

As shown in FIG. 1, the server(s) 104 also includes the pose search system 102 as part of a digital content management system 106. The digital content management system 106 communicates with the client device 108 to perform various functions associated with the client application 110 such as storing and managing a repository of digital images, determining or accessing labels for digital content depicted within the digital images, and retrieving digital images based on a digital image query. For example, the pose search system 102 communicates with the database 114 to access a repository of digital images and to determine digital content portrayed in the digital images (e.g., as indicated by labels). Indeed, as further shown in FIG. 1, the environment includes a database 114. In particular, the database 114 stores information such as a repository of digital images as well as various neural networks including a pose neural network and a 2D-to-3D neural network.

Although FIG. 1 illustrates a particular arrangement of the environment, in some embodiments, the environment has a different arrangement of components and/or may have a different number or set of components altogether. For instance, in some embodiments, the pose search system 102 is implemented by (e.g., located entirely or in part on) the client device 108 and/or a third-party device. In addition, in one or more embodiments, the client device 108 communicates directly with the pose search system 102, bypassing the network 112. Further, in some embodiments, the database 114 is located external to the server(s) 104 (e.g., in communication via the network 112) or located on the server(s) 104 and/or on the client device 108.

Figure 2:
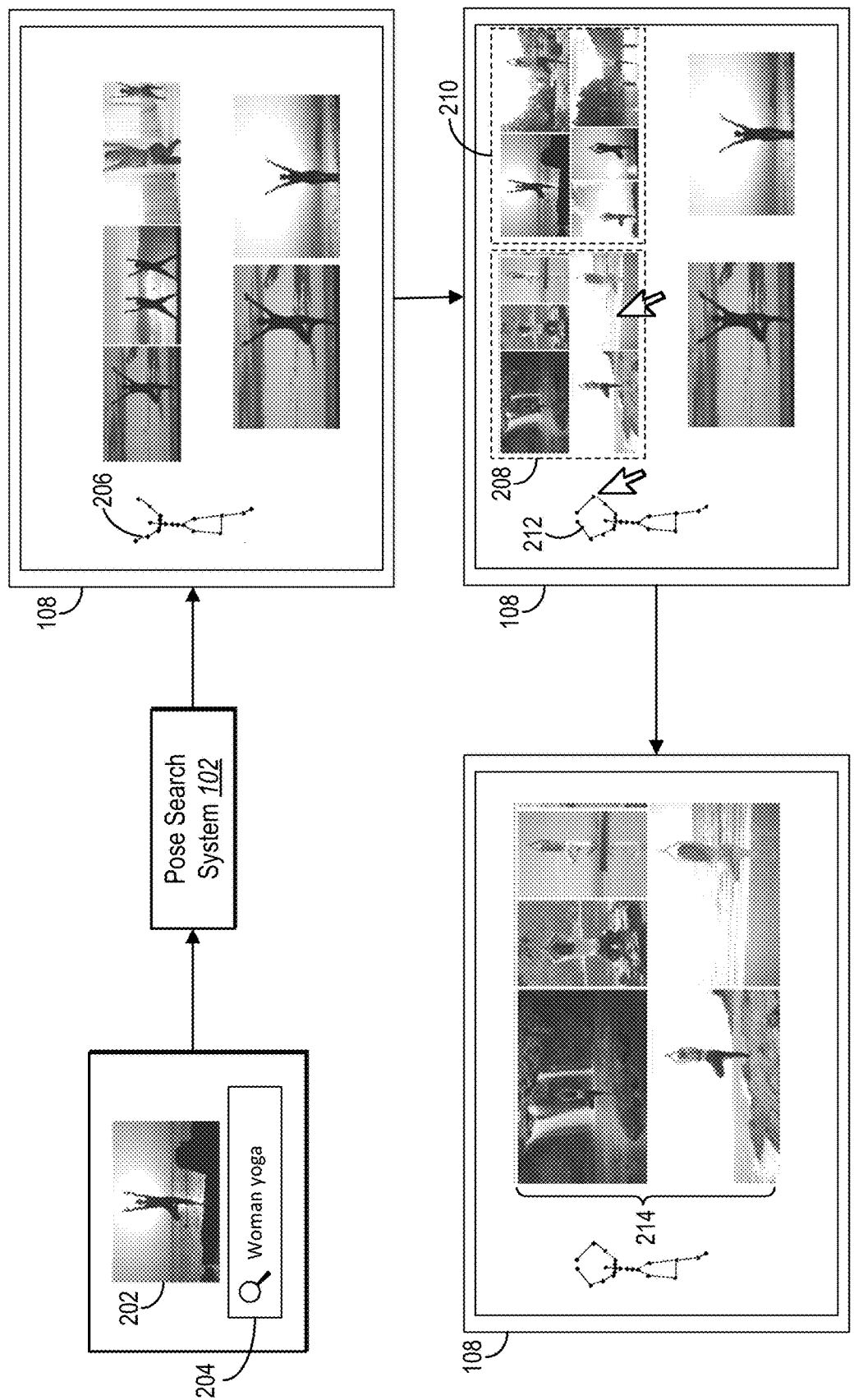
FIG. 2 illustrates an overview of a process of generating and providing query responses including digital images portraying certain poses in accordance with one or more embodiments.

As mentioned, in one or more embodiments, the pose search system 102 generates a query response including digital images of poses corresponding to a query pose (and/or depicting digital content reflecting a keyword query). In particular, to generate a query response, the pose search system 102 receives a digital image query including one or more pieces of information, such as: i) a keyword query indicating particular digital content, ii) a digital image of a human figure in a query pose, and/or iii) a virtual mannequin arranged according to a query pose. In some cases, the pose search system 102 generates a query response in the form of individual digital images in addition (or alternatively) to clustering digital images into digital pose image groups. FIG. 2 illustrates an example flow for generating a query response from a digital image query in accordance with one or more embodiments. FIG. 2 provides an overview of generating a query response based on various inputs such as keyword queries, digital images, and (modifications to) virtual mannequins. Thereafter, additional detail is provided for the various acts and processes in relation to subsequent figures.

As illustrated in FIG. 2, the pose search system 102 receives a digital image query that includes a digital image 202 together with a keyword query 204. For example, the pose search system 102 receives an indication of user input via the client device 108 to input the keyword query 204 and/or to select (or upload) the digital image 202.

In response to receiving the digital image 202, the pose search system 102 determines a query pose of the digital image 202. Particularly, the pose search system 102 determines locations or arrangements of joints and segments associated with a human figure shown in the digital image 202. In certain cases, the pose search system 102 utilizes a pose neural network to process the digital image 202 and identify locations for joints and/or segments.

Additionally, in response to receiving the keyword query 204, the pose search system 102 identifies digital images from the repository of digital images that depict digital content corresponding to the keyword query 204. To elaborate, the pose search system 102 identifies digital images with labels that match the keyword query 204, "Woman yoga." In some cases, the pose search system 102 utilizes a neural network to process digital images and identify depicted digital content items or objects to compare with the keyword query 204.

Based on the query pose of the digital image 202, the pose search system identifies digital images depicting human figures corresponding to the query pose from a digital image repository. For example, the pose search system 102 searches among digital images depicting digital content corresponding the keyword query 204 to identify digital images that further depict human figures in the query pose. In some embodiments, the pose search system 102 utilizes a pose neural network to generate candidate digital poses for stored digital images. In these or embodiments, the pose search system 102 compares candidate digital poses with the query pose to identify those candidate digital poses within a threshold similarity of the query pose. For instance, the pose search system 120 compares pose vectors for the query pose and the candidate digital poses to identify pose vectors within a threshold distance of the query pose in a pose feature space. In addition, the pose search system 102 provides the identified digital images for display on the client device 108.

In further response to receiving the digital image 202, the pose search system 102 generates a virtual mannequin 206. More specifically, based on determining the query pose for the digital image 202, the pose search system 102 generates the virtual mannequin 206 by arranging joints and segments according to the query pose. As shown in FIG. 2, the pose search system 102 arranges the virtual mannequin with an open-armed, one-legged pose to match the query pose identified from the digital image 202. In addition, the pose search system 102 provides the virtual mannequin 206 for display on the client device 108.

As further illustrated in FIG. 2, the pose search system 102 generates, and provides for display, the selectable element 208 for a first digital pose image group and the selectable element 210 for a second digital pose image group. In particular, the pose search system 102 generates the digital pose image groups (corresponding to the selectable elements 208 and 210) based on the keyword query 204. For instance, the pose search system 102 identifies, from a digital image repository, digital images that depict digital content reflecting the keyword query 204 ("Woman yoga"). From these digital images, the pose search system 102 further determines poses of human figures with the digital images and clusters the digital images into digital pose image groups according to their respective poses. For instance, form the keyword query 204 ("Woman yoga"), the pose search system 102 generates a first digital pose image group to include digital images of women in a first yoga pose and generates a second digital pose image group to include digital images of women in a second yoga pose.

In some embodiments, the pose search system 102 generates the digital pose image groups based on the digital image 202 and/or the virtual mannequin 206. To elaborate, the pose search system 102 determines a query pose of the digital image 202 or the virtual mannequin 206 and clusters stored digital images into digital pose image groups based on the query pose. For instance, the pose search system 102 generates a first digital pose image group to include digital images whose poses are within a first threshold similarity of the query pose (e.g., within a first threshold distance in a pose feature spade). In addition, the pose search system 102 generates the second digital pose image group to include digital images whose poses are within a second threshold (or between the first threshold and the second threshold) similarity of the query pose.

The pose search system 102 further provides the selectable elements 208 and 210 corresponding to the digital pose image groups for display on the client device 108. In particular, the pose search system 102 generates a selectable element 208 for a first digital pose image group and generates the selectable element 210 for a second digital pose image group. The pose search system 102 further provides the selectable elements 208 and 210 for display by the client device 108. In some cases, the pose search system 102 generates the selectable element 208 to include visual representations of a certain number of digital images within first digital pose image group (e.g., a top 4 or a top 5 digital images).

As further illustrated in FIG. 2, the pose search system 102 receives user interaction selecting the selectable element 208. Based on the user interaction selecting the selectable element 208, the pose search system 102 provides digital images (e.g., the digital image 214) from the corresponding digital pose image group for display on the client device 108. For example, if the digital pose image group corresponding to the selectable element 208 includes 50 digital images, the pose search system 102 provides the 50 digital images for display in a (scrollable) user interface on the client device 108.

As also shown in FIG. 2, the pose search system 102 also (or alternatively) receives user interaction to modify or manipulate the virtual mannequin 206. Indeed, the pose search system 102 generates a modified virtual mannequin 212 based on user interaction to manipulate one or more joints or segments to change the pose of the virtual mannequin. In response to detecting the modification of the virtual mannequin 206, the pose search system 102 determines a modified query pose of the modified virtual mannequin 212. From the modified query pose, the pose search system 102 further identifies digital images depicting human figures in (or within a threshold similarity of) the modified query pose. Indeed, as shown, the pose search system 102 identifies the digital images 214 depicting woman in yoga poses standing on one leg with their hands in closed positions, similar to the modified virtual mannequin 212.

Although FIG. 2 illustrates an embodiment that utilizes a keyword query, digital image portraying a query pose, a virtual mannequin, and pose image groups, it will be appreciated that the pose search system 102 can utilize individual or different combinations of these search strategies in different embodiments. Indeed, in some embodiments the pose search system 102 utilizes a keyword search and digital image with a query pose to efficiently identify matching digital images. Similarly, in one or more embodiments the pose search system 102 utilizes a a digital image and query pose to identify an initial set of digital images and a virtual mannequin to with a query pose to identify a focused set of digital images. Moreover, in some implementations the pose search system utilizes a keyword search together with representative images from pose image groups to refine digital search results. Accordingly, in addition to the particular approach illustrated in FIG. 2, the pose search system 102 can utilizes a variety of different search modalities to efficiently, flexibly, and accurately identify digital images that match a particular target pose.

Figure 3:
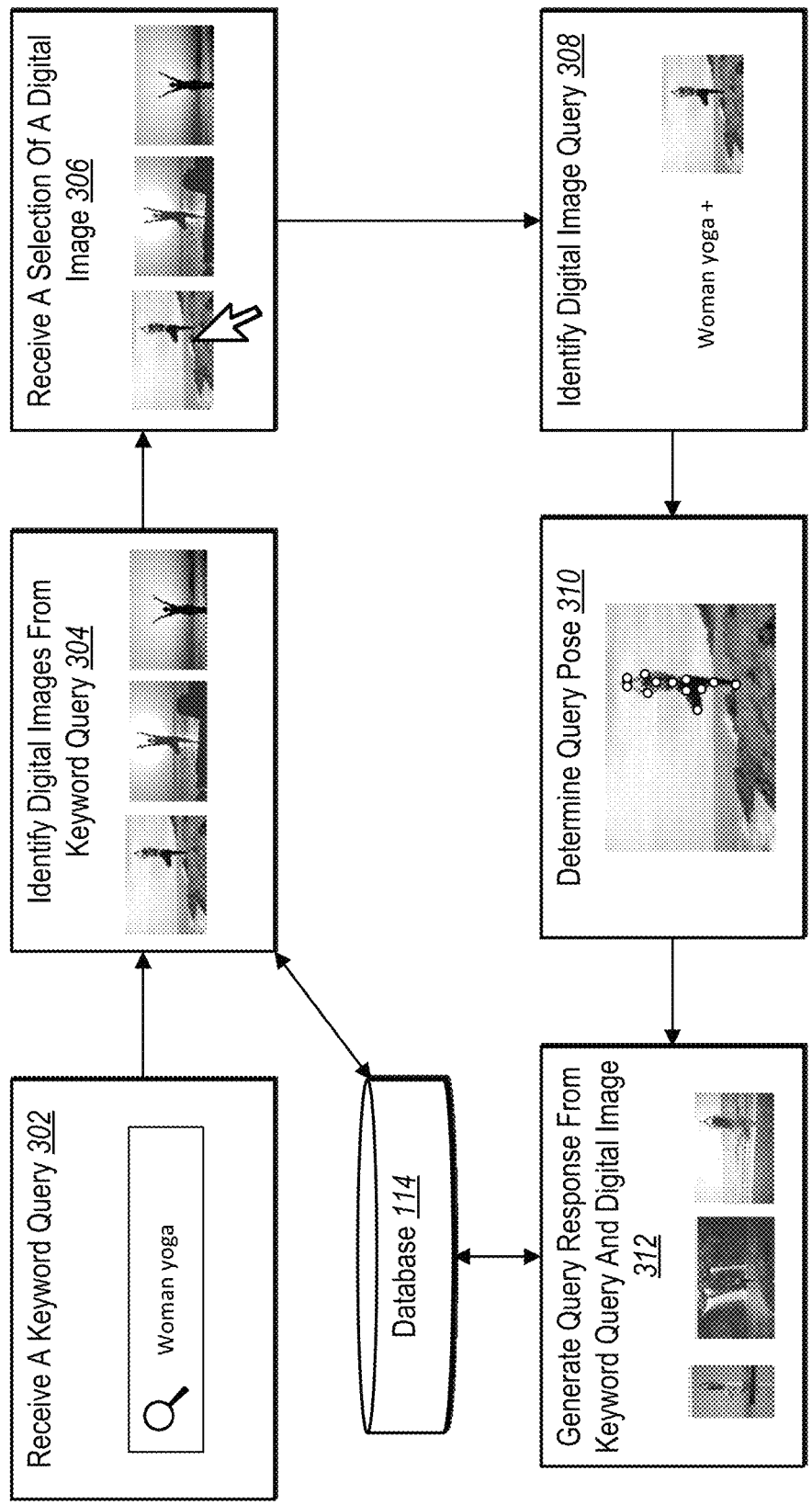
FIG. 3 illustrates an example sequence of acts for generating a query response based on a keyword query and a digital image in accordance with one or more embodiments.

As just mentioned, in certain embodiments, the pose search system 102 generates a query response based on a particular input such as a keyword query in conjunction with a selected (or uploaded) digital image indicating a query pose. In particular, the pose search system 102 identifies digital images depicting digital content reflecting the keyword query and further depicting human figures whose poses match the query pose. FIG. 3 illustrates a sequence of acts for generating a query response based on a keyword query and a digital image depicting a human figure in accordance with one or more embodiments.

As illustrated in FIG. 3, the pose search system 102 performs an act 302 to receive a keyword query. In particular, the pose search system 102 receives a keyword query such as "Woman yoga" from user interaction via the client application 110 on the client device 108. In some cases, the pose search system 102 provides a digital image search interface as part of the client application 110 and that includes a keyword query bar whereby a user enters a keyword query.

In response to receiving a keyword query, the pose search system 102 further performs an act 304 to identify digital images from the keyword query. More specifically, the pose search system 102 searches a repository of digital image stored within the database 114 to identify digital images that match, or otherwise correspond to, the keywork query "Woman yoga." For example, the pose search system 102 identifies digital images that depict digital content that reflects the keyword query. In some cases, digital images within the database 114 are labeled according to their respective depicted digital content. Thus, the pose search system 102 identifies those digital images whose labels correspond to the keyword query "Woman yoga."

In one or more embodiments, the pose search system 102 generates a keyword vector for the keyword query and compares the keyword vector with digital content vectors associated with the digital content depicted with the stored digital images. Indeed, the pose search system 102 further generates digital content vectors for the digital content associated with the stored digital images. Digital content vectors can include feature vector representations of pixels/objects portrayed in a digital image (e.g., a feature vector generated by processing the digital image utilizing a neural network). In some cases, digital content vectors also include a feature vector representation of a label for digital content portrayed in a digital image (e.g., a feature vector generated by processing a digital image label utilizing a neural network). To compare the vectors, in some cases, the pose search system 102 determines distances between the keyword vector and the digital content vectors in a vector space. The pose search system 102 thus selects and surfaces those digital images whose label vectors are within a threshold distance of the keyword vector in the vector space.

As further illustrated in FIG. 3, the pose search system 102 further performs an act 306 to receive a selection of a digital image. More particularly, the pose search system 102 receives user interaction from the client device 108 to select a surfaced digital image from among the digital images identified as corresponding to the keyword query (e.g., from act 304). In some embodiments, the pose search system 102 receives a selection in the form of a click, a touch, a tap, or some other user input.

Based on the user interaction selecting a digital image from among the digital images depicting digital content that reflects the keyword query, the pose search system 102 further performs an act 308 to identify a digital image query. For instance, the pose search system 102 identifies or receives a digital image query that includes both the keyword query ("Woman yoga") and the selected digital image. The pose search system 102 thus utilizes the digital image query as the basis for generating a query response by identifying digital images that not only depict digital content that corresponds to the keyword query but that also depict human figures in poses that correspond to the pose of the human figure in the selected digital image.

Along these lines, and as further illustrated in FIG. 3, the pose search system 102 performs an act 310 to determine a query pose. In particular, the pose search system 102 determines or generates a query pose from the selected digital image. For example, the pose search system 102 determines locations of joints and interconnecting segments for the human figure depicted within the selected digital image. In some embodiments, the pose search system 102 utilizes a pose neural network to generate the query pose from the selected digital image. Additional detail regarding the pose neural network is provided below with specific reference to FIG. 11.

As shown in FIG. 3, based on determining the query pose for the selected digital image, the pose search system 102 performs an act 312 to generate a query response from the keyword query and the selected digital image. More specifically, the pose search system 102 generates a query response by identifying, from the repository of digital images stored in the database 114, those digital images that correspond to both the keyword query and the selected digital image. Indeed, the pose search system 102 identifies digital images depicting digital content reflecting "Woman yoga" (e.g., as determined from labels of the digital content) and further depicting human figures in poses matching (or within a threshold similarity of) the query pose.

In some embodiments, to generate the query response, the pose search system 102 compares candidate digital poses of human figures depicted within the stored digital image with the query pose. For example, the pose search system 102 generates pose vectors for the query pose and for the candidate digital poses associated with the stored digital images. In addition, the pose search system 102 compares the pose vectors by, for instance, embedding the pose vectors in a pose feature space and determining distances between the pose vectors in the pose feature space. The pose search system 102 thus selects, for including in a query response, those digital images whose pose vectors are within a threshold similarity (e.g., distance) of the pose vector of the query pose and whose label vectors are within a threshold similarity (e.g., distance) of the keyword vector. In certain embodiments, the pose search system 102 utilizes a pose neural network to generate and compare the pose vectors.

Although FIG. 3 illustrates an example sequence of acts 302-312, additional or alternative sequences of acts are also possible. For example, in some embodiments, the pose search system 102 identifies, from a digital image repository within the database 114, a subset of digital images that portray digital content reflecting one or more keywords of the keyword query (e.g., received as part of the act 302). In these or other embodiments, the pose search system 102 searches the identified subset of digital images to identify digital images depicting human figures in poses corresponding to a query pose. For instance, the pose search system 102 determines a query pose from a digital image such as a selected digital image from among the set of digital images depicted digital content reflecting the keyword query or a different digital image. Thus, the pose search system 102 searches for and identifies digital images (e.g., from among the set of digital images depicting digital content reflecting the keyword query) to include within a query response.

Figure 4:
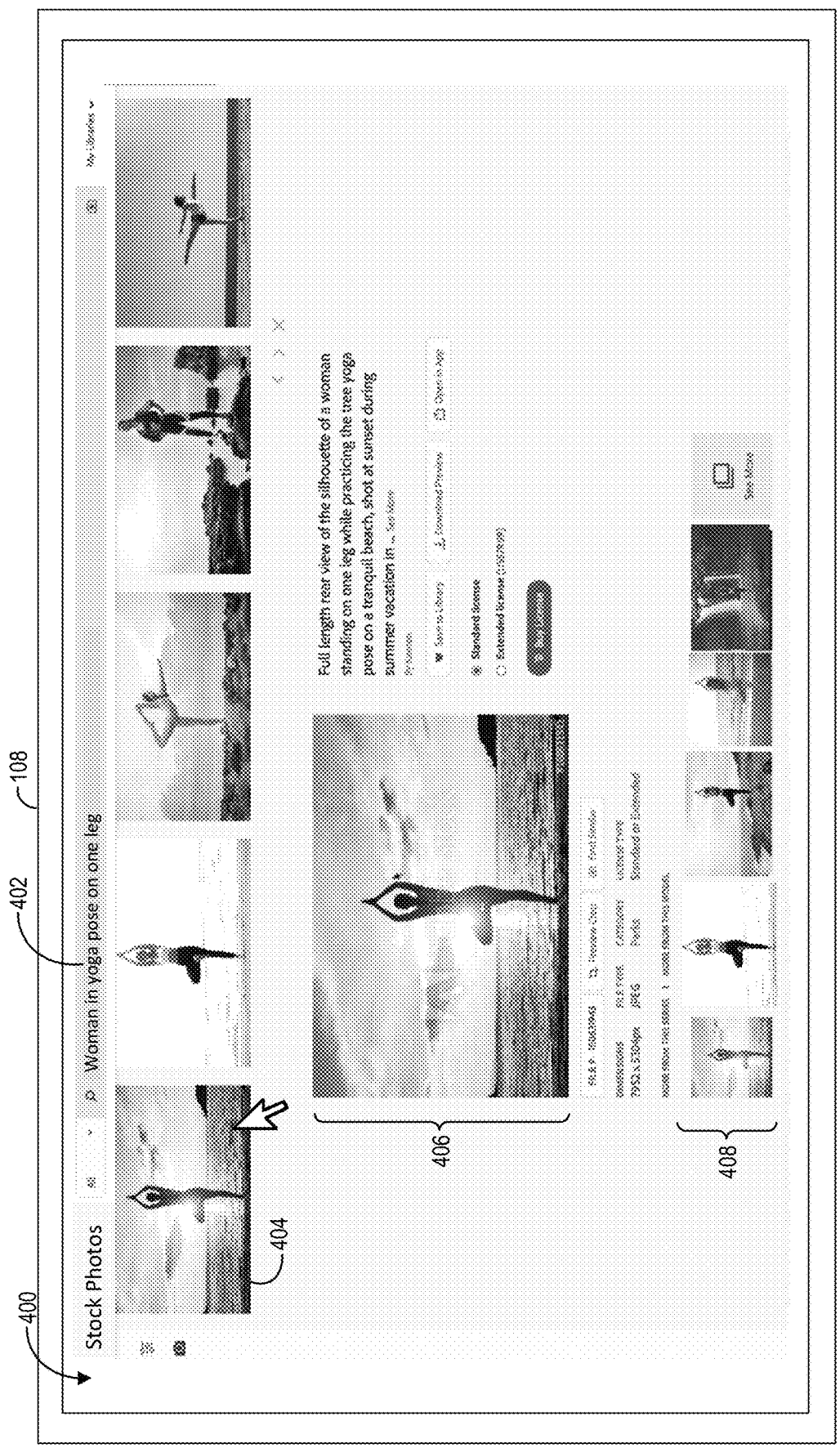
FIG. 4 illustrates an example digital image search interface including a query response from a keyword query and a digital image in accordance with one or more embodiments.

As mentioned above, based on generating a query response, the pose search system 102 provides the query response for display on the client device 108. Indeed, the pose search system 102 generates and provides a digital image search interface for display on the client device 108 and that includes a generated query response. In particular, the pose search system 102 provides a digital image search interface that includes visual representations (e.g., thumbnails) of a set of digital images within the query response generated as a result of a digital image query including both a keyword query and a digital image indicating a query pose. FIG. 4 illustrates the client device 108 displaying a digital image search interface 400 in accordance with one or more embodiments.

As illustrated in FIG. 4, the digital image search interface 400 includes a keyword query 402. In response to the keyword query, the pose search system 102 identifies and provides for display a set of digital images that reflect "Woman in yoga pose on one leg." Indeed, the digital image search interface 400 includes a digital image 404 (and additional digital image along the same row as the digital image 404) that depicts a woman in a one-legged yoga pose.

In addition, the pose search system 102 receives user interaction selecting the digital image 404. Based on the user interaction, the pose search system 102 provides for display the selected digital image 406 and the query response 408. Indeed, the digital image search interface 400 includes the selected digital image 406 reflecting a larger version of the digital image 404 selected from the results of the keyword query 402. In addition, the digital image search interface 400 includes the query response 408 that includes a set of digital images that not only correspond to the keyword query 402 but also correspond to the selected digital image 406. Indeed, each image in the query response 408 depicts a woman in a yoga pose on one leg (per the keyword query 402) and further depicts women in a pose corresponding the query pose of the selected digital image 406 (e.g., with the hands closed overhead). Thus, the pose search system 102 provides the digital image search interface 400 as an interactive tool to identify and view digital pose images based on a combination of the keyword query 402 and the query pose of the selected digital image 406.

By providing the interactive tool to identify and view digital pose images in this way, the pose search system 102 provides improved efficiency over conventional systems. Indeed, in one or more embodiments the pose search system 102 requires relatively few user interactions (e.g., clicks) to present an accurate set of digital images depicting a particular pose. By contrast, many conventional systems require repetitive searches using multiple keyword phrases to narrow and refine a search and further require excessive numbers of navigational user interactions to locate desirable digital images from the provided results. As a result of providing more efficient search interfaces that require fewer user interactions to access desired data and/or functionality, the pose search system 102 can utilize fewer computing resources such as processing time, processing power, and memory.

Additionally, in some embodiments, the pose search system 102 performs additional and/or alternative acts to those described in relation to FIG. 4. For example, in some cases, the pose search system 102 does not necessarily require or receive the keyword query 402. Instead, the pose search system 102 receives a digital image (e.g., an uploaded or otherwise selected digital image) and determines the query pose from the received digital image. For instance, the pose search system 102 receives the digital image 404 and generates the query response 408 from the received digital image 404. As another example, the pose search system 102 receives the digital image 404 and subsequently receives the keyword query 402. Based on determining a query pose from the digital image 404, and further based on the keyword query 402, the pose search system 102 generates the query response 408 including digital images depicting human figures in poses similar to the query pose and further depicting digital content reflecting the keyword query 402.

Figure 5:
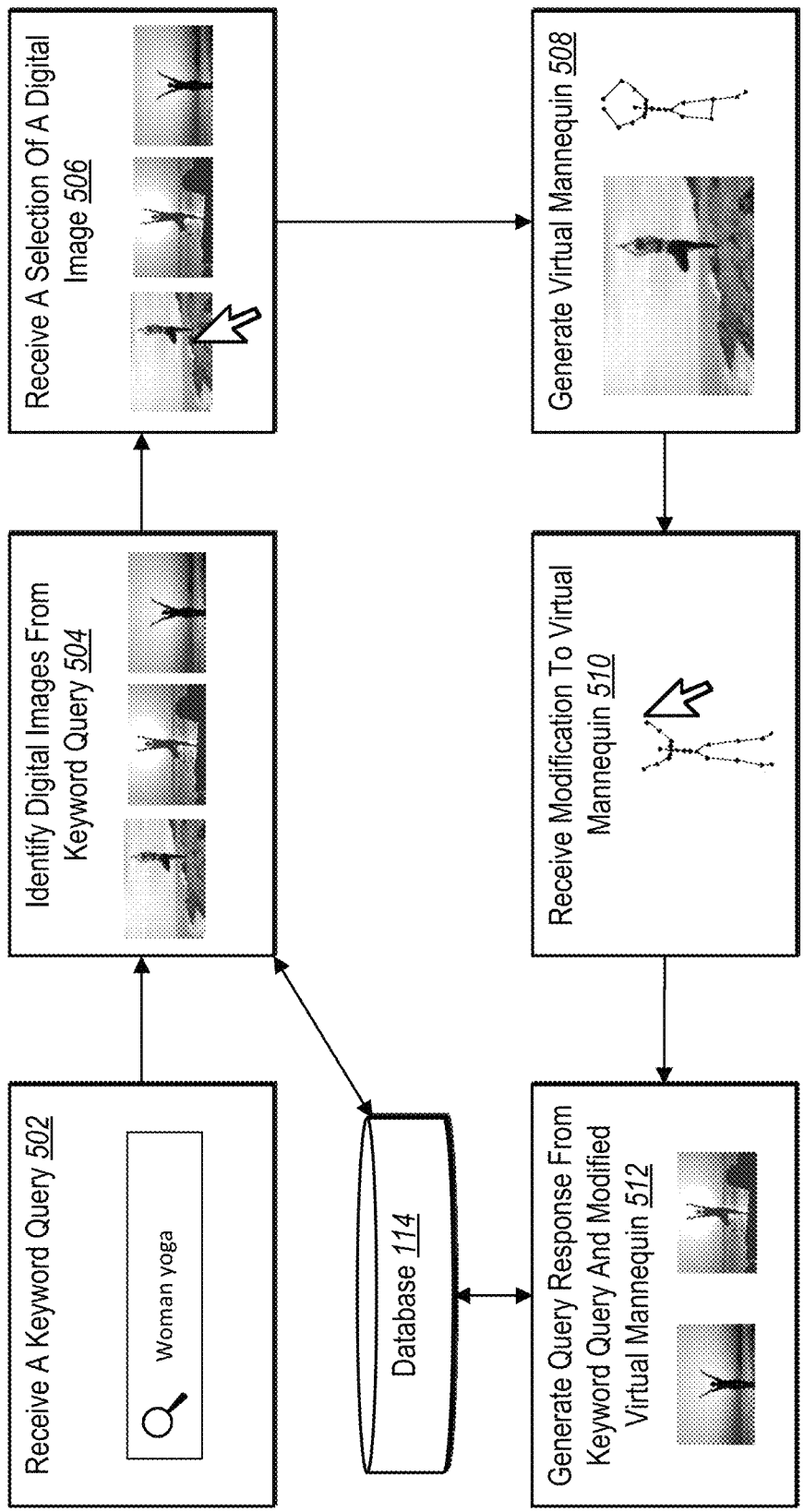
FIG. 5 illustrates an example sequence of acts for generating a query response from a keyword query and a modified virtual mannequin in accordance with one or more embodiments.

As mentioned above, in certain described embodiments, the pose search system 102 generates a query response based on user interaction with a virtual mannequin. Indeed, the pose search system 102 generates and provides a virtual mannequin that is manipulable to define a query pose for searching for digital pose images. FIG. 5 illustrates an example sequence of acts for generating a query response based on user interaction with a virtual mannequin (as well as a keyword query) in accordance with one or more embodiments.

As illustrated in FIG. 5, the pose search system 102 performs an act 502 to receive a keyword query. In particular, the pose search system 102 receives user input to enter a keyword query by way of the client device 108. For instance, the pose search system 102 receives user interaction with a digital image search interface to enter a keyword query such as "Woman yoga" in a search bar.

As also illustrated in FIG. 5, the pose search system 102 further performs an act 504 to identify digital images from the keyword query. Specifically, the pose search system 102 identifies digital images from a repository of digital images stored within the database 114. For example, the pose search system 102 identifies digital images that depict digital content reflecting the keyword query. As described, the pose search system 102 identifies the digital images by generating and comparing digital content vectors (for digital content portrayed within stored digital images) with one or more keyword vectors associated with the keyword query.

Based on identifying one or more digital images depicting content reflecting the keyword query, the pose search system 102 further performs an act 506 to receive a selection of a digital image. In particular, the pose search system 102 receives or detects user interaction selecting a digital image from among the identified digital images corresponding to the keyword query. In some cases, the pose search system 102 receives the selection via a digital image search interface.

In response to receiving or otherwise identifying a selection of a digital image, the pose search system 102 further performs an act 508 to generate a virtual mannequin. To elaborate, the pose search system 102 determines a pose for the selected digital image by identifying locations for joints and segments of the human figure depicted within the selected digital image (e.g., via a pose neural network). In addition, the pose search system 102 generates a virtual mannequin from the determined pose of the selected digital image. Indeed, the pose search system 102 generates a virtual mannequin that includes manipulable joints (as indicated by dots or circles) and segments (as indicated by line segments connecting the dots or circles) at locations corresponding to locations of joints and segments of the selected digital image. As shown in FIG. 5, for instance, the virtual mannequin includes joints and segments arranged according to the pose of the human figure in the selected digital image from the act 506 (e.g., with the hands overhead, standing on one leg).

In one or more embodiments, the pose search system 102 generates a three-dimensional virtual mannequin. Particularly, the pose search system 102 generates a virtual mannequin with three-dimensional joints and segments that are manipulable in the abscissa (X) coordinates, ordinate (Y) coordinates, and applicate (Z) coordinates. For example, the pose search system 102 processes the pose (e.g., the two-dimensional pose) of the selected digital image to determine, extrapolate, or lift a three-dimensional pose from the two-dimensional pose. The pose search system 102 further generates the three-dimensional virtual mannequin by arranging joints and segments according the three-dimensional pose of the digital image. In some cases, the pose search system 102 further enables the client device 108 to manipulate a viewing angle of the three-dimensional virtual mannequin. For instance, the pose search system 102 provides controls to change a perspective of by modifying a yaw, a pitch, and/or a roll of a camera perspective of the three-dimensional virtual mannequin. Additional detail regarding manipulating a three-dimensional virtual mannequin is provided below with reference to FIG. 12.

In one or more embodiments, the pose search system 102 utilizes a 2D-to-3D neural network to generate a three-dimensional virtual mannequin. Indeed, the pose search system 102 utilizes the 2D-to-3D neural network to generate or determine a three-dimensional pose of a selected digital image (e.g., as selected in the act 506) and to generate a three-dimensional virtual mannequin with three-dimensional, manipulable joints and segments arranged according to the determined pose. Additional detail regarding the 2D-to-3D neural network is provided below with reference to FIG. 11.

As further illustrated in FIG. 5, the pose search system 102 performs an act 510 to receive a modification to the virtual mannequin. In particular, the pose search system 102 receives a modification via user interaction from the client device 108 to move or adjust a location of a joint or a segment of the virtual mannequin. Based on the user interaction, the pose search system 102 generates a modified virtual mannequin in the updated arrangement.

Further, the pose search system 102 determines a query pose associated with the modified virtual mannequin. More specifically, the pose search system 102 determines a query pose from the modified locations of joints and segments of the modified virtual mannequin. As illustrated in FIG. 5, the pose search system 102 receives a modification from a one-legged pose to a two-legged pose, and further receives a modification from hands together above the head to hands spread out above the head. Thus, the pose search system 102 determines a query pose indicated by the modified virtual in the two-legged, hands spread out pose.

As further illustrated in FIG. 5, the pose search system 102 performs an act 512 to generate a query response from the keyword query and the modified virtual mannequin. Indeed, the pose search system 102 identifies one or more digital images that depict digital content corresponding to the keyword query ("Woman yoga") and that further depict human figures corresponding to the query pose. Specifically, the pose search system 102 identifies digital images with candidate digital poses that are within a threshold similarity of the query pose. As shown, the pose search system 102 identifies digital images that depict human figures standing on one leg with their hands spread out as indicated by the modified virtual mannequin. Because the keyword query indicates "Woman yoga," the pose search system 102 further ensures that the identified digital image depict women doing yoga.

Although FIG. 5 illustrates a particular sequence of acts 502-512, additional and/or alternative acts are also possible. For example, in some cases, the pose search system 102 receives the keyword query (e.g., the act 502) and identifies, from the database 114, a subset of digital images depicting digital content reflecting the keyword query. In addition, the pose search system 102 searches the subset of digital images to identify digital images depicting human figures in poses corresponding to a query pose (e.g., as indicated by a digital image or a virtual mannequin). In some cases, on the other hand, the pose search system 102 first identifies a subset of digital images depicting human figures in poses corresponding to a query pose and subsequently searches the subset of digital images to identify digital images that also depict digital content reflecting the keyword query.

In certain embodiments, the pose search system 102 performs the acts 506-510 before the acts 502 and 504. For example, the pose search system 102 receives a selection of a digital image, generates a virtual mannequin based on the pose of the selected digital image, and receives a modification to the virtual mannequin before then receiving a keyword query and identifying digital images based on the keyword query. In some such embodiments, the pose search system 102 determines the query pose of the modified virtual mannequin, identifies digital images depicting human figures in poses similar to the query pose, and subsequently receives a keyword query to identify digital images that, in addition to depicting human figures in poses corresponding to the query pose, also depict digital content reflecting the keyword query for including in a query response.

In some embodiments, the pose search system 102 performs the act 508 to generate a virtual mannequin without first performing the act 506 to receive a selection of a digital image. Indeed, the pose search system 102 generates a virtual mannequin in a default or generic pose, irrespective of poses of human figures within digital images. The pose search system 102 further performs the act 510 to receive a modification to the virtual mannequin and subsequently performs the act 512 to generate a query response based on the modified virtual mannequin and the keyword query. In some cases, the pose search system 102 generates a query response without requiring a keyword query and by instead only identifying digital images depicting human figures in poses similar to the query pose of the modified virtual mannequin.

Figure 6A:
FIGS. 6A-6B illustrate an example digital image search interface including query results based on a virtual mannequin in accordance with one or more embodiments.

As mentioned above, the pose search system 102 generates and provides a digital image search interface for display on the client device 108. In particular, the pose search system 102 provides a digital image search interface that includes a query response and that further includes a manipulable virtual mannequin. FIG. 6A illustrates the client device 108 displaying a digital image search interface 600 that includes a virtual mannequin along with a query result based on a keyword query and a selected digital image in accordance with one or more embodiments. Thereafter, FIG. 6B illustrates the client device 108 displaying the digital image search interface 600 including an updated query result based on modifications to the virtual mannequin in accordance with one or more embodiments.

As illustrated in FIG. 6A, the digital image search interface 600 includes a keyword query 602 and a query response 608. Indeed, based on the keyword query 602, the pose search system 102 identifies and provides the query response 608 that includes digital images of women doing yoga (responsive to the "Woman yoga" query). In addition, the pose search system 102 receives user interaction selecting the top-left digital image from the query response 608. Based on the user interaction selecting the digital image 604, the pose search system 102 generates and provides the virtual mannequin 606 for display within the digital image search interface 600. Indeed, the digital image search interface 600 includes the virtual mannequin 606 as an overlay superimposed on the selected digital image 604 and arranged according to the pose of the selected digital image 604.

Figure 6B:
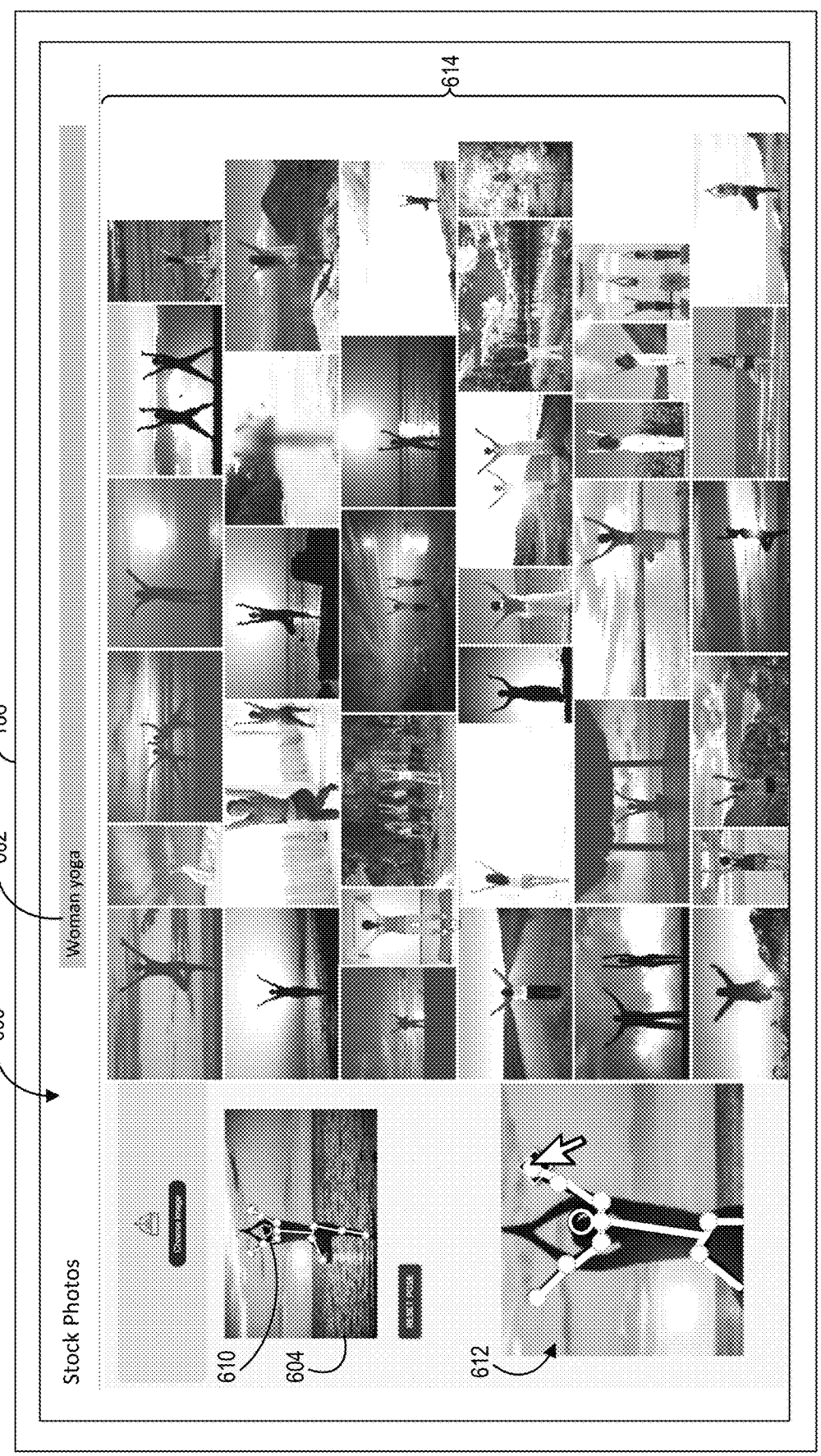

As illustrated in FIG. 6B, the digital image search interface 600 includes an updated query response 614 based on a modified virtual mannequin 610. Specifically, the updated query response 614 includes different digital images than the query response 608 of FIG. 6A. Indeed, based on the query pose of the modified virtual mannequin 610, the pose search system 102 identifies digital images that match the query pose. As shown, the digital images within the query response 614 include woman doing yoga (based on the "Woman yoga" query) in one-legged, hands spread out poses indicated by the modified virtual mannequin 610.

To generate the query response 614, the pose search system 102 receives user interaction to modify the virtual mannequin 606. Indeed, the pose search system 102 receives user interaction to change or manipulate one or more joints or segments of the virtual mannequin 606 to thereby modify its pose and generate a modified virtual mannequin 610. In some embodiments, as shown in FIG. 6B, in response to user interaction with the modified virtual mannequin 610, the pose search system 102 further generates and provides a zoomed-in view 612 of the modified virtual mannequin superimposed on the selected digital image 604. Thus, the pose search system 102 provides easier manipulation of the joints and segments, especially for digital images where the human figures are smaller and the virtual mannequin is therefore harder to manipulate. In any event, based on user interaction to generate the modified virtual mannequin 610, the pose search system 102 generates and provides the updated query response 614 that includes digital images portraying human figures in the modified pose (and reflecting the keyword query 602).

Figure 7:
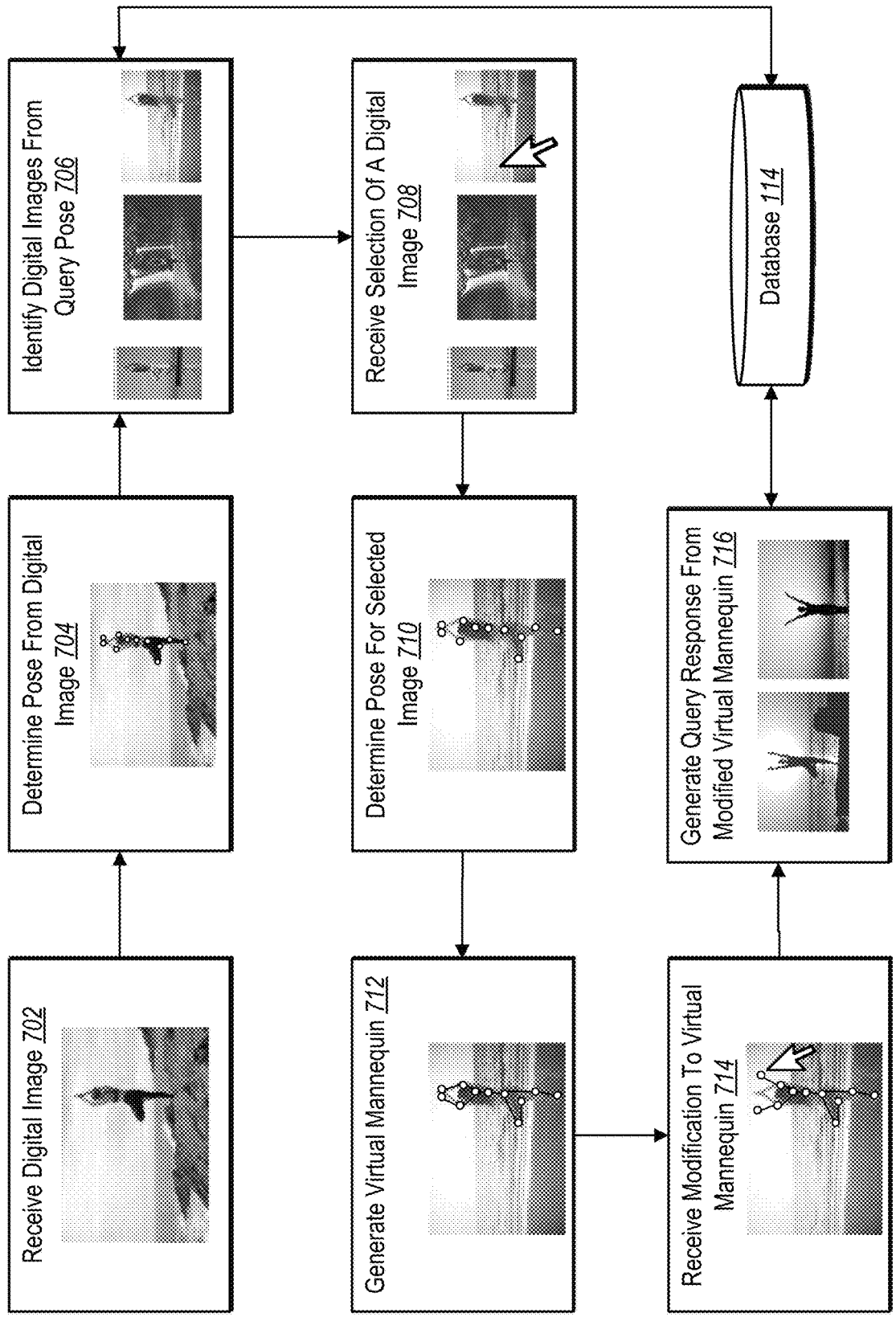
FIG. 7 illustrates an example sequence of acts for generating a query response based on a digital image and a virtual mannequin in accordance with one or more embodiments.

As mentioned above, in certain embodiments, the pose search system 102 generates a query response based on receiving a digital image without a keyword query. In particular, the pose search system 102 identifies digital images corresponding to a query pose of a virtual mannequin reflecting a pose of an uploaded digital image. FIG. 7 illustrates an example sequence of acts for generating a query response from a digital image (without a keyword query) in accordance with one or more embodiments.

As illustrated in FIG. 7, the pose search system 102 performs an act 702 to receive a digital image. In particular, the pose search system 102 receives a digital image in the form of an upload or a selection from a repository of digital images. Indeed, the pose search system 102 receives user interaction to upload (e.g., from the client device 108 or some third-party source) or select a digital image to use a basis for a digital image search.

As illustrated in FIG. 7, the pose search system 102 further performs an act 704 to determine a pose from the digital image. More specifically, the pose search system 102 utilizes a pose neural network to identify a human figure within the digital image and to further determine locations of joints and segments for the human figure. Thus, the pose search system 102 determines a pose for the received (e.g., uploaded or selected) digital image.

Based on determining the pose, as illustrated in FIG. 7, the pose search system 102 performs an act 706 to identify digital images from the pose. Indeed, the pose search system 102 accesses a repository of digital images stored on the database 114 to search for and identify digital images that depict human figures with candidate digital poses corresponding to the pose. For example, the pose search system 102 identifies digital images depicting human figures in poses that are within a threshold similarity of the pose of a woman standing on one leg with her hands in an overhead, closed position.

Additionally, the pose search system 102 performs an act 708 to receive a selection of a digital image. In particular, the pose search system 102 receives or detects user interaction selecting a digital image from among the identified digital images matching the pose (e.g., from the act 706). For example, the pose search system 102 receives a touch, a tap, or a click of a digital image from within a user interface presented via the client device 108.

As further illustrated in FIG. 7, the pose search system 102 performs an act 710 to determine a pose for the selected digital image. More specifically, the pose search system 102 determines a new pose for the digital image selected from among the identified digital images that reflect the pose of the received digital image. To determine the new pose, the pose search system 102 utilizes a pose neural network to identify a human figure shown in the selected digital image and to further determine locations for joints and segments of the human figure.

From the new pose of the selected digital image, the pose search system 102 further performs an act 712 to generate a virtual mannequin. Indeed, the pose search system 102 generates a virtual mannequin by arranging manipulable joints and interconnecting segments according to the locations of corresponding joints and segments indicated by the pose of the human figure identified in the selected digital image. As shown in FIG. 7, the pose search system 102 generates the virtual mannequin and provides the virtual mannequin for display as an overlay superimposed on the human figure portrayed in the selected digital image.

As further shown in FIG. 7, the pose search system 102 performs an act 714 to receive a modification to the virtual mannequin. More specifically, the pose search system 102 receives user interaction selecting and moving one or more joints or segments of the virtual mannequin. Based on the manipulation of the virtual mannequin, the pose search system 102 generates a modified virtual mannequin and determines a query pose of the virtual mannequin as well. For example, the pose search system 102 determine a query pose defined by the locations of the joints and segments as modified from the user input.

As also illustrated in FIG. 7, the pose search system 102 performs an act 716 to generate a query response from the modified virtual mannequin. In particular, the pose search system 102 identifies and provides for display those digital images that depict human figures with candidate digital poses corresponding to the query pose of the modified virtual mannequin. For instance, the pose search system 102 searches the digital image repository in the database 114 to identify digital images that portray human figures in poses that are within a threshold similarity of the query pose of the modified virtual mannequin. Indeed, the pose search system 102 determines the poses of the digital images within the database 114 and further compares the poses with the query pose, as described.

Although FIG. 7 illustrates an example sequence of acts 702-716, additional and/or alternative sequences are also possible. For example, in some embodiments, the pose search system 102 omits the acts 706-710 and instead performs the act 712 to generate the virtual mannequin based on the pose from the received digital image (e.g., the digital image received via the act 702). As another example, the pose search system 102 provides the virtual mannequin at the outset, before (or without) receiving any digital images or identifying poses within any digital images. Continuing this example, the pose search system 102 provides the virtual mannequin in a default or a generic pose and subsequently receives a modification to the virtual mannequin (e.g., the act 714). The pose search system 102 thus determines a query pose from the modified virtual mannequin.

In some cases, the pose search system 102 further receives a digital image (e.g., the act 702) and identifies digital images depicting digital content corresponding to the received digital image (e.g., depicting a man or a woman or a particular scenery) and that further depict human figures in poses similar to the query pose of the modified virtual mannequin. In other cases, the pose search system 102 does not receive a digital image at all and instead generates a query response based solely on the query pose of the modified virtual mannequin. In still other cases, the pose search system 102 receives a keyword query in conjunction with a received digital image and/or a modified virtual mannequin. Thus, the pose search system 102 generates a query response including digital images depicting digital content reflecting the keyword query and/or the digital image and further depicting human figures in poses corresponding to the query pose of the modified virtual mannequin.

Figure 8A:
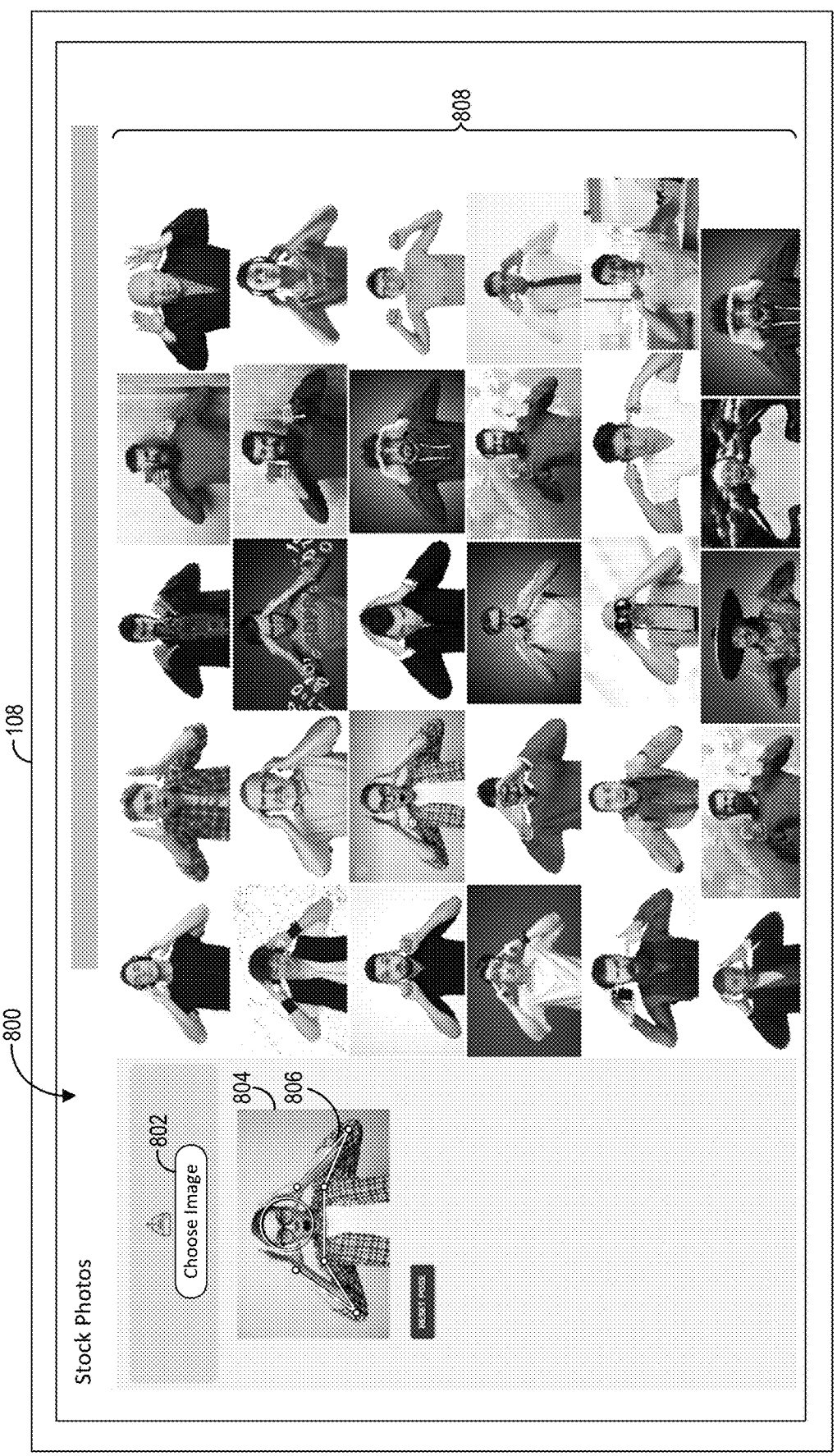
FIGS. 8A-8B illustrate an example digital image search interface including a virtual mannequin and a query response in accordance with one or more embodiments.
Figure 8B:
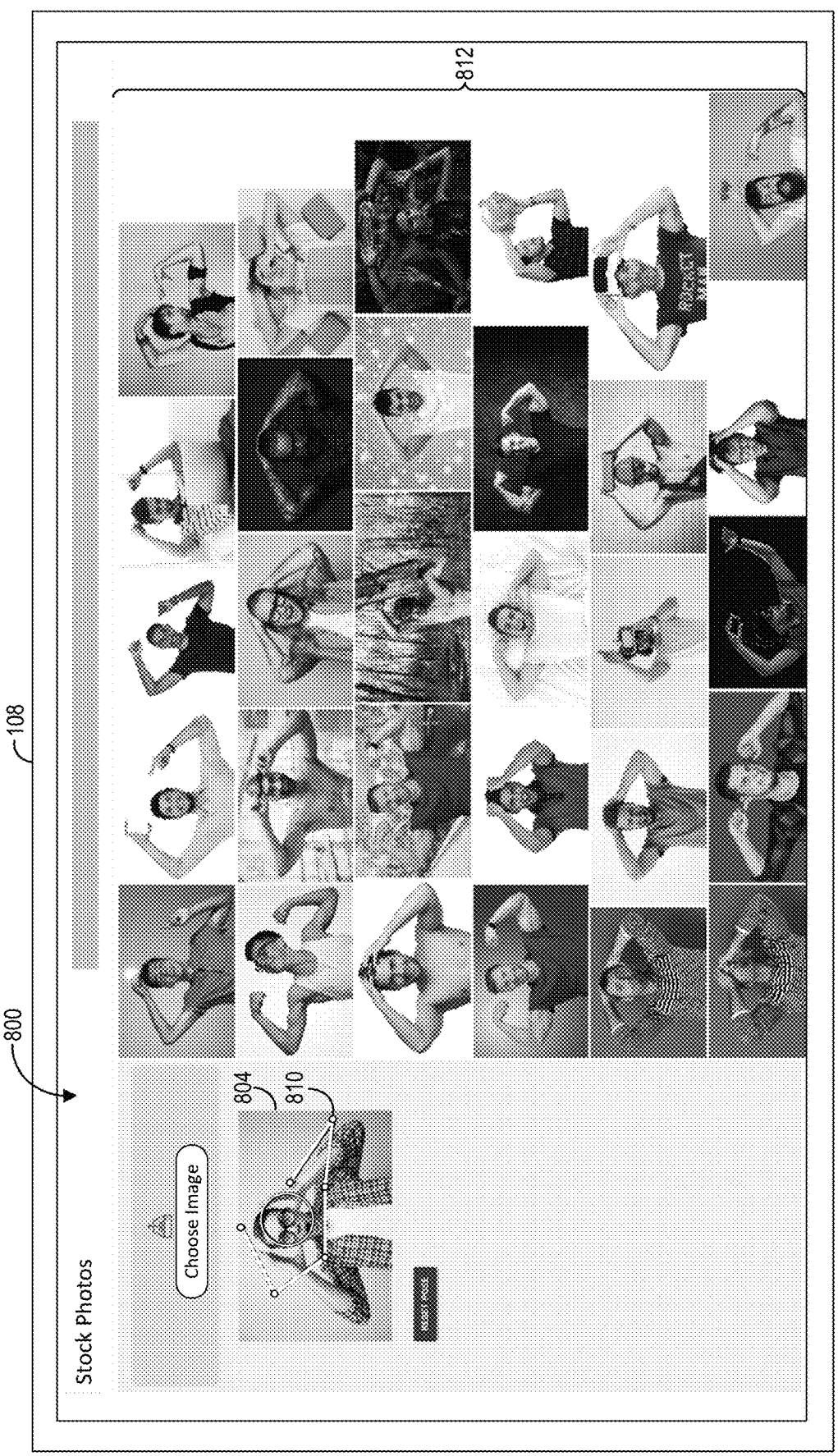

As mentioned, in embodiments described herein, the pose search system 102 generates and provides a digital image search interface that includes a query response based on a received digital image. In particular, the pose search system 102 receives a digital image (e.g., an uploaded digital image), determines a pose from the digital image, provides a virtual mannequin based on the pose of the digital image, and generates a query response in response to modifications made to the virtual mannequin. FIG. 8A illustrates the client device 108 displaying an example digital image search interface 800 including a virtual mannequin and query response based on an uploaded digital image in accordance with one or more embodiments. Thereafter, FIG. 8B illustrates the client device 108 displaying the digital image search interface 800 including an updated query response based on modifications to the virtual mannequin in accordance with one or more embodiments.

As illustrated in FIG. 8A, the digital image search interface 800 includes an image selection element 802. In particular, the image selection element 802 is selectable to upload or otherwise select a digital image to use as a basis for a digital image search. For instance, the pose search system 102 receives or detects user interaction selecting the image selection element 802 and further receives user interaction selecting or uploading a digital image 804. In response to receiving the digital image 804, the pose search system further determines a pose for the human figure portrayed in the digital image 804 and generates the virtual mannequin 806 from the determined pose. As shown, the digital image search interface 800 includes the virtual mannequin 806 as an overlay superimposed on the received digital image 804.

From the received digital image 804, the pose search system 102 further generates the query response 808. More specifically, the pose search system 102 generates the query response 808 based on determining a pose of the received digital image 804. Indeed, the digital image search interface 800 includes the query response 808 made up of digital images depicting human figures in poses corresponding to the pose determined from the received digital image 804. As shown, the digital images in the query response 808 depict human figures with their hands near their heads, similar to the pose of the human figure in the received digital image 804. In addition to including the received digital image 804 and the query response 808, the pose search system provides the digital image search interface 800 and generates the virtual mannequin 806 arranged according to the pose of the received digital image 804.

As mentioned, the pose search system 102 generates a query pose based on modifications to the virtual mannequin 806. As illustrated in FIG. 8B, the digital image search interface 800 includes a modified virtual mannequin 810 that results in an updated query response 812. Indeed, the pose search system 102 receives user interaction modifying or manipulating the virtual mannequin 806 to thus generate the modified virtual mannequin 810. As shown, the modified virtual mannequin 810 is arranged in a different pose from the virtual mannequin 806, where one arm is raised above the head.

As a result of receiving user interaction to generate the modified virtual mannequin 810, the pose search system 102 generates the updated query response 812. As shown, the updated query response 812 includes digital images depicting human figures in poses different from the poses of the query response 808 such as, for example, poses where one arm is raised over the head. Indeed, as displayed by the client device 108, the digital image search interface 800 includes the updated query response 812, the received digital image 804, and the modified virtual mannequin 810 superimposed on the received digital image 804.

Figure 9:
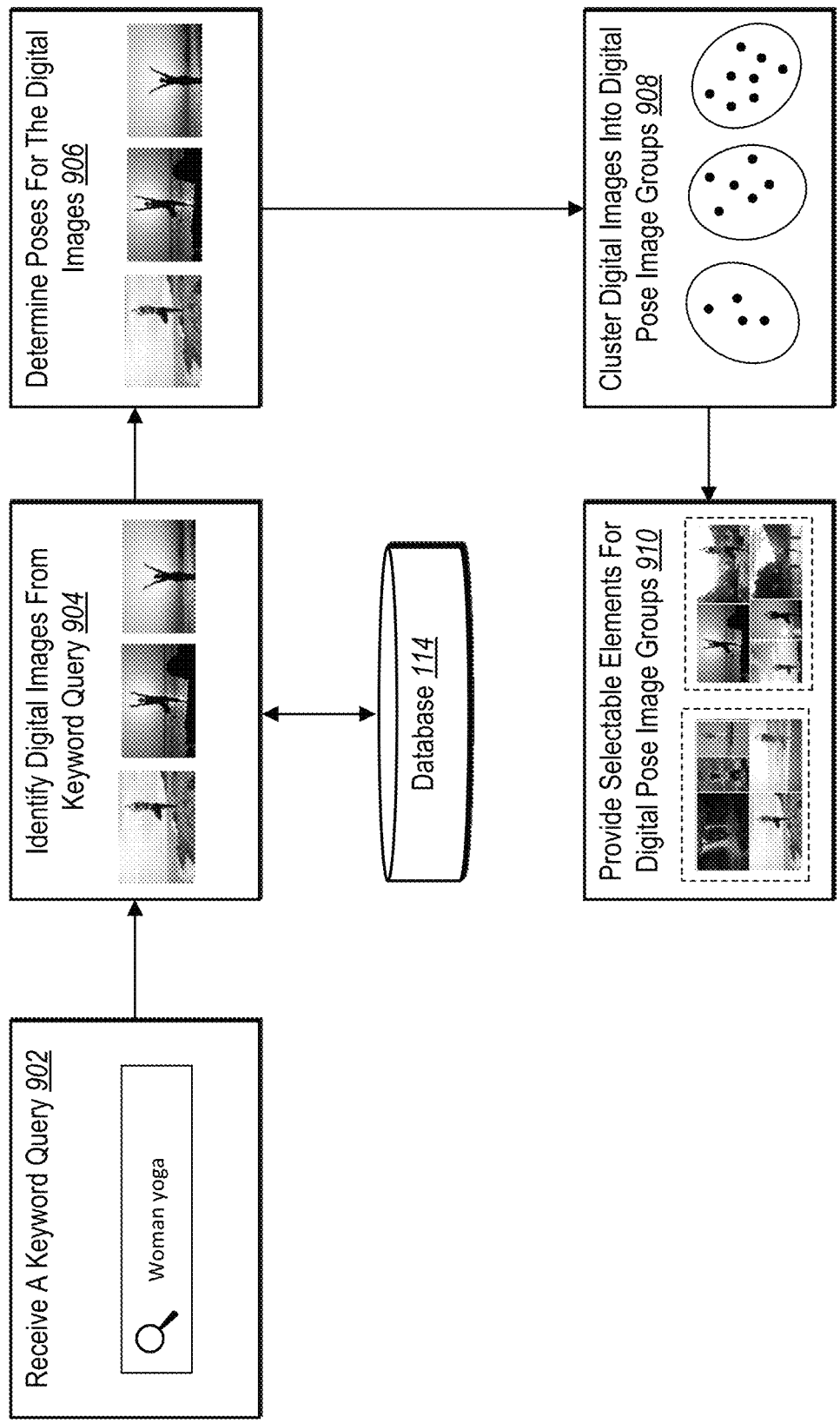
FIG. 9 illustrates an example sequence of acts for generating and providing digital pose image groups in accordance with one or more embodiments.

As mentioned above, in certain embodiments, the pose search system 102 generates digital pose image groups (e.g., based on a keyword query). In particular, the pose search system 102 generates digital pose image groups according to pose clusters identified for a plurality of digital images stored in a digital image repository. FIG. 9 illustrates an example sequence of acts for generating digital pose image groups in accordance with one or more embodiments.

As illustrated in FIG. 9, the pose search system 102 performs an act 902 to receive a keyword query. In particular, the pose search system 102 receives or detects user interaction to input a keyword query via a digital image search interface displayed on the client device 108. As shown, the pose search system 102 receives a keyword query "Woman yoga" as a basis for searching digital images.

As further illustrated in FIG. 9, the pose search system 102 performs an act 904 to identify digital images from the keyword query. More specifically, the pose search system 102 searches a repository of digital images stored within the database 114 to identify those digital images that depict digital content reflecting the keyword query. For example, the pose search system 102 identifies labels associated with stored digital images and compares the labels with the keyword query terms such as "woman" and "yoga." In some cases, the pose search system 102 generates a keyword vector for the keyword query (or separate keyword vectors for the keyword query terms) and compares the keyword vector(s) with digital content vectors associated with the digital images. In any event, the pose search system 102 identifies one or more digital images that correspond to the keyword query.

Additionally, the pose search system 102 performs an act 906 to determine poses for the identified digital images. More particularly, the pose search system 102 determines poses for the digital images identified as corresponding to the keyword query. For instance, the pose search system 102 processes the digital images to identify human figures within the digital images and to determine locations of joints and segments for the human figures. In some cases, the pose search system 102 utilizes a pose neural network to determine poses for human figures depicted within the digital images by determining locations of joints and segments.

Based on determining the poses of the identified digital images, the pose search system 102 performs an act 908 to cluster the digital images into digital pose image groups. To elaborate, the pose search system 102 generates pose vectors for the digital images identified as corresponding to the keyword query. In addition, the pose search system 102 compares the pose vectors within a pose feature space to identify or generate pose clusters. For example, the pose search system 102 clusters vectors of similar poses together. In some cases, the pose search system 102 utilizes a clustering algorithm to cluster the pose vectors. Based on clustering the pose vectors in the pose feature space, the pose search system 102 thus identifies digital pose image groups for the digital images corresponding to the clustered pose vectors.

As further illustrated in FIG. 9, the pose search system 102 performs an act 910 to provide selectable elements for the digital pose image groups. More specifically, the pose search system 102 generates a selectable element for each of the identified digital pose image groups. In some embodiments, the pose search system 102 generates a selectable element to include visual representations of a particular number (e.g., one, two, four, five, six, or ten) of digital images from within the corresponding digital pose image group. For example, the pose search system 102 selects four digital images to represent within the selectable element by identifying, within the pose feature space, a cluster center for the pose vectors of the digital pose image group and by further identifying the four nearest neighbor vectors from the cluster center. Based on identifying the four digital images to include within the selectable element, the pose search system 102 generates and provides the selectable element for display within a digital image search interface. As another example, the pose search system 102 identifies and selects a single digital image for inclusion within a selectable element. For instance, the pose search system 102 identifies a cluster center for the pose vectors and selects a single digital image whose pose vector is closest (e.g., the nearest neighbor) to the cluster center.

Although FIG. 9 illustrates a particular sequence of acts 902-910, additional and/or alternative sequences are also possible. For example, in some cases, the pose search system 102 omits the acts 902 and 904 and does not receive a keyword query or identify digital images from the keyword query. Instead, the pose search system 102 generates clusters of digital images and provides corresponding selectable elements based on a digital image search. Specifically, the pose search system 102 receives a digital image and searches for additional digital images depicting digital content reflected by the received digital image. The pose search system 102 further performs the acts 906-910 to determine poses for the identified digital images, cluster the identified digital images into digital pose image groups, and to provide selectable elements for the digital pose image groups.

As another example, the pose search system 102 determines a query pose from a received digital image or from a modified virtual mannequin. Based on the query pose, the pose search system 102 further identifies and provides digital images depicting human figures in poses similar to the query pose. As part of identifying and providing the digital images based on the query pose, the pose search system 102 performs the acts 906-910. For instance, the pose search system 102 determines poses for stored digital images within a digital image repository, clusters the digital images into digital pose image groups, and provides selectable elements for the digital pose image groups. In some cases, the pose search system 102 generates clusters of digital images where each cluster corresponds to a different pose within a threshold similarity of the query pose.

Additionally, in one or more embodiments, the pose search system 102 performs additional acts beyond those described in relation to FIG. 9 (e.g., by performing acts described in relation to FIGS. 3, 5, and/or 7). For example, in response to user interaction selecting a particular selectable element, the pose search system 102 identifies a representative digital image associated with the selectable element. In particular, the pose search system 102 identifies a center pose vector (e.g., a pose vector that is nearest to a cluster center) for the corresponding cluster and selects the corresponding digital image to represent the cluster. Further, the pose search system 102 generates and provides a virtual mannequin as an overlay superimposed on the representative digital image. In response to receiving a modification to the virtual mannequin, the pose search system 102 determines a query pose for the modified virtual mannequin and generates a query response including digital images depicting human figures in poses similar to the query pose. In some embodiments, the pose search system 102 does not necessarily generate and provide a virtual mannequin, but instead determines a query pose directly from the representative digital image.

Figure 10:
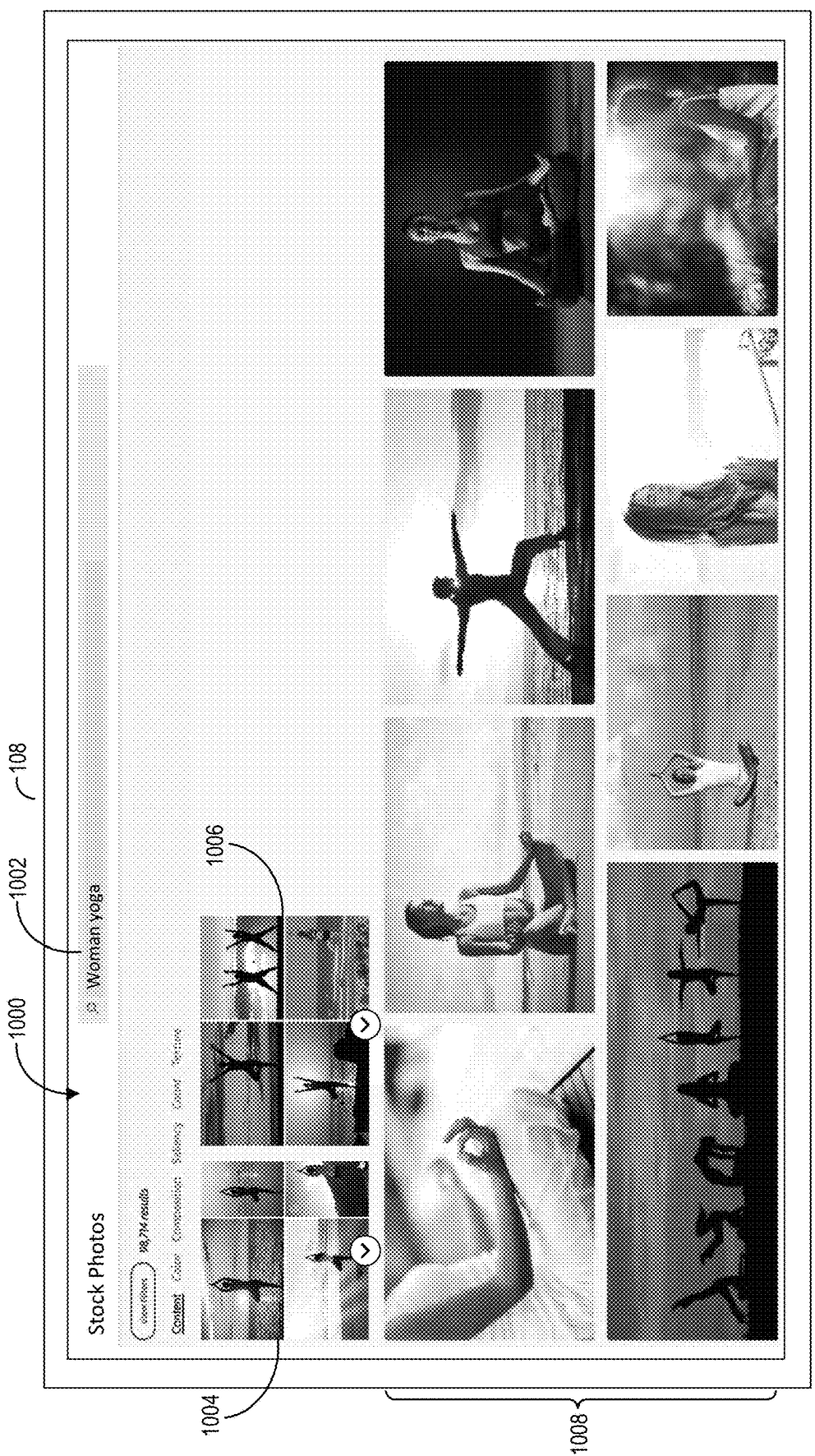
FIG. 10 illustrates an example digital image search interface including selectable elements for digital pose image groups in accordance with one or more embodiments.

As mentioned, in certain embodiments, the pose search system 102 generates and provides a digital image search interface that includes selectable elements for digital pose image groups. In particular, in response to a keyword query, the pose search system 102 provides selectable elements for display on the client device 108 within a digital image search interface. FIG. 10 illustrates the client device 108 displaying a digital image search interface 1000 that includes selectable elements 1004 and 1006 corresponding to respective digital pose image groups in accordance with one or more embodiments.

As illustrated in FIG. 10, the digital image search interface 1000 includes a keyword query 1002, a first selectable element 1004, a second selectable element 1006, and a query response 1008. In particular, the pose search system 102 receives the keyword query 1002 from the client device 108 and generates the first selectable element 1004, the second selectable element 1006, and the query response 1008 from the keyword query 1002. For example, the pose search system 102 identifies digital images corresponding to the keyword query "Woman yoga" and provides the digital images in the query response 1008.

In addition, the pose search system 102 generates digital pose image groups corresponding to the selectable elements 1004 and 1006. For instance, the pose search system 102 generates a first digital pose image groups by identifying digital images depicting human figures in a first pose (and depicting digital content reflecting the keyword query) for the first selectable element 1004. In addition, the pose search system 102 generates a second digital pose image group by identifying digital images depicting human figures in a second pose (and depicting digital content reflecting the keyword query) for the second selectable element 1006. Thus, the pose search system 102 provides the first selectable element 1004 selectable to view the digital images within the first digital pose image group for display within the digital image search interface 1000. Similarly, the pose search system 102 provides for display the second selectable element 1006 selectable to view the digital images within the second digital pose image group.

In response to user interaction selecting the selectable element 1004, the pose search system 102 provides the digital images associated with the selectable element 1004 for display within the digital image search interface 1000 (e.g., by replacing the query response 1008). In some cases, the pose search system 102 further receives user interaction selecting a particular digital image from the cluster associated with the selectable element 1004. Based on the user interaction, the pose search system 102 further determines a cluster pose associated with the digital image and generates a query response to provide for display within the digital image search interface 1000. In certain embodiments, the pose search system 102 also generates a provides a virtual mannequin for the selected digital image and performs a digital image search based on modifications to the virtual mannequin, as further described herein.

As mentioned, in some embodiments, the pose search system 102 generates a query response based on different information such as a keyword query, a digital image, and/or user interaction with a virtual mannequin. The above descriptions of FIGS. 3-10 (and particularly the sequences of FIGS. 3, 5, 7, and 9) relate to specific embodiments of the pose search system 102 in generating query responses based on this various information or input. In some cases, however, the pose search system 102 is not limited to these embodiments. For instance, combining elements of FIGS. 3, 5, 7, and/or 9, the pose search system 102 generates a query response including digital pose image clusters and individual digital images by identifying digital images depicting digital content reflecting a keyword query and further depicting human figures in poses corresponding to a query pose of a modified (three-dimensional) virtual mannequin. Indeed, the pose search system 102 generates query responses (including individual digital images and/or digital pose image groups) based on any possible combination of the various inputs or digital image queries described herein. For example, the pose search system 102 generates query responses utilizing any possible combination of the acts described in relation to FIGS. 3, 5, 7, and 9.

Figure 11:
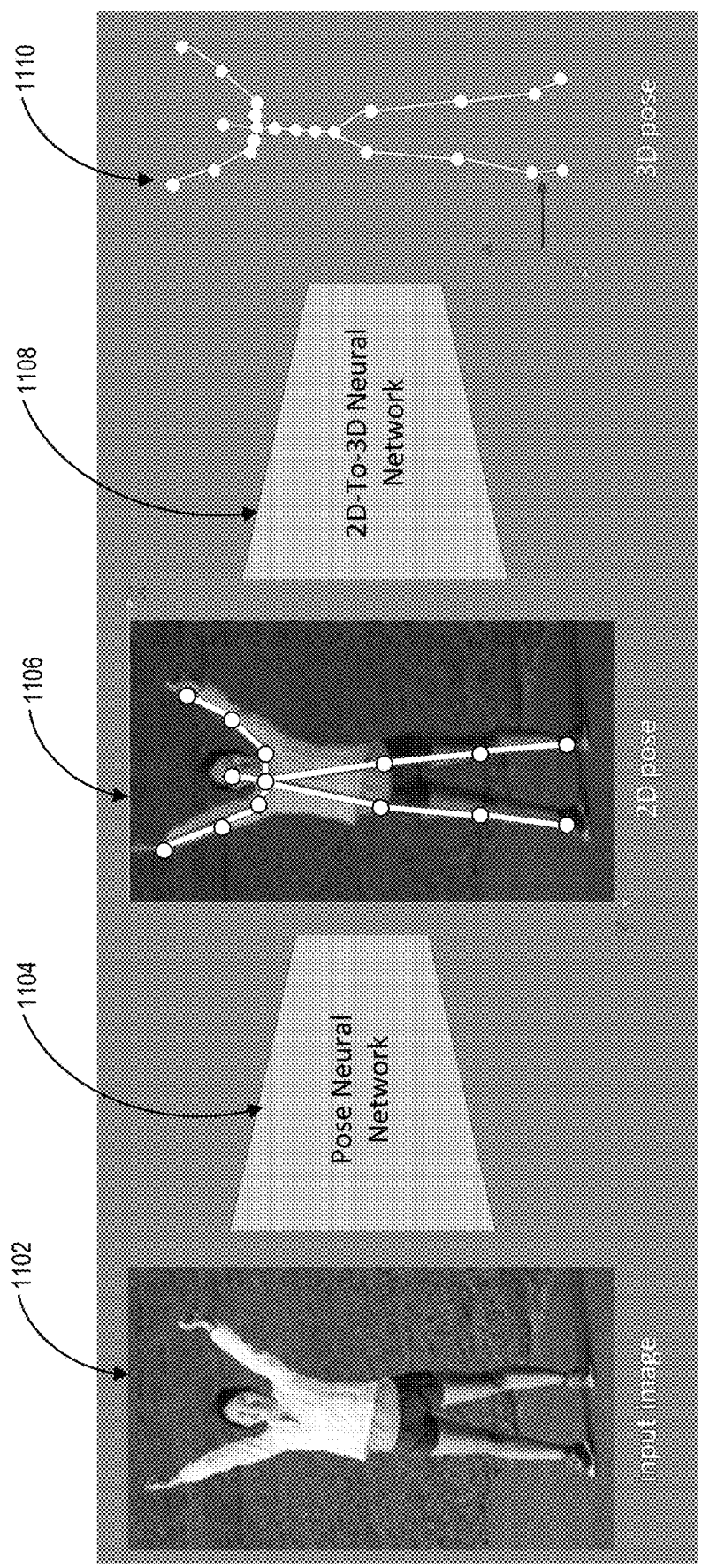
FIG. 11 illustrates an example flow for determining two-dimensional and three-dimensional poses in accordance with one or more embodiments.

As mentioned, in some embodiments, the pose search system 102 determines or extracts a pose of human figure depicted within a digital image. In particular, the pose search system 102 utilizes a pose neural network to determine locations of joints and segments for a human figure depicted in a digital image. Additionally, the pose search system 102 utilizes a 2D-to-3D neural network to determine a three-dimensional pose from a two-dimensional pose of a digital image. FIG. 11 illustrates determining a two-dimensional pose 1106 utilizing a pose neural network 1104 and determining a three-dimensional pose 1110 utilizing a 2D-to-3D neural network 1108 in accordance with one or more embodiments.

As illustrated in FIG. 11, the pose search system 102 identifies a digital image 1102. In particular, the pose search system 102 receives a selection or an upload of the digital image 1102. In addition, the pose search system 102 determines a two-dimensional pose 1106 associated with the digital image 1102. For example, the pose search system 102 utilizes a pose neural network 1104 to identify a human figure depicted within the digital image 1102 and to determine locations of joints and segments of the human figure. In some embodiments, the pose search system 102 utilizes the pose neural network 1104 to identify 14 two-dimensional joints from the digital image 1102. For example, the pose search system 102 utilizes the pose neural network 1104 to extract 14 two-dimensional joint vectors.

In one or more embodiments, the pose search system 102 utilizes a pose neural network 1104 in the form of a convolutional neural network to, from an input digital image of a human figure, jointly predict confidence maps for body part detection and part affinity fields to learn associated body parts for the human figure. For example, to identify body parts, the pose search system 102 generates a confidence map that includes a two-dimensional representation of confidence measures that a particular body part (e.g., an head or a torso) is located at any given pixel. To identify limbs connecting the body parts, the pose search system 102 also generates part affinity fields that include a two-dimensional vector field for each limb, including location and orientation information across the region of support for the limb. The pose search system 102 generates a part affinity field for each type of limb joining two associated body parts. In addition, the pose search system 102 utilizes the pose neural network 1104 to parse the digital image into portions for bipartite matching of associated body part candidates. For example, the pose search system 102 can utilize a pose neural network 1104 such as the pose neural network described by Zhe Cao, Gines Hidalgo, Tomas Simon, Shih-en Wei, and Yaser Seikh in OpenPose: Realtime Multi-Person 2D Pose Estimation using Part Affinity Fields arXiv: 1812.08008 (2018), which is incorporated by reference herein in its entirety. In some cases, the pose neural network 1104 is a hybrid neural network based on a combination of GoogleNet and OpenPose. The pose neural network 1104 can utilize a variety of neural network architectures to determine a pose.

In addition to generating the two-dimensional pose 1106 for the digital image 1102, the pose search system 102 further generates a two-dimensional virtual mannequin arranged according to the two-dimensional pose 1106. More specifically, as shown in FIG. 11, the pose search system 102 arranges virtual joints and virtual segments (for a virtual mannequin) overlaid at locations corresponding to the joints and segments of the two-dimensional pose 1106 for the human figure depicted in the digital image 1102.

As further illustrated in FIG. 11, the pose search system 102 generates a three-dimensional pose 1110 from the two-dimensional pose 1106. In particular, the pose search system 102 utilizes the 2D-to-3D neural network 1108 to process the two-dimensional pose 1106 and generate the three-dimensional pose 1110. For example, the pose search system 102 utilizes the 2D-to-3D neural network 1108 to generate three-dimensional joint features for the joints identified in the two-dimensional pose 1106. Indeed, the pose search system 102 utilizes the 2D-to-3D neural network 1108 to project the two-dimensional joint features onto a unit sphere to thereby generate three-dimensional joint features.

In some embodiments, the pose search system 102 utilizes a 2D-to-3D neural network 1108 that estimates body joint locations in three-dimensional space (e.g., the three-dimensional pose 1110) from a two-dimensional input (e.g., the two-dimensional pose 1106). For instance, the pose search system 102 utilizes a 2D-to-3D neural network 1108 in the form of a deep feed-forward neural network that generates a series of points in three-dimensional space from a series of two-dimensional points. In particular, the pose search system 102 utilizes the 2D-to-3D neural network 1108 to learn a function that reduces or minimizes prediction error of predicting three-dimensional points by projecting two-dimensional points onto a fixed global space (with respect to a root joint) over a dataset of a particular number of poses. For example, the pose search system 102 can utilize a 2D-to-3D neural network 1108 such as the 2D-to-3D neural network described by Julieta Martinez, Rayat Hossain, Javier Romero, and James J. Little in A Simple Yet Effective Baseline for 3D Human Pose Estimation arXiv:1705.03098 (2017), which is incorporated by reference herein in its entirety. The pose search system 102 can utilize a variety of machine learning models (e.g., neural networks) to project two-dimensional joint features and generate three-dimensional joint features.

In some embodiments, the pose search system 102 generates a three-dimensional virtual mannequin based on the three-dimensional pose 1110. In particular, the pose search system 102 generates virtual joints and virtual segments arranged according to the three-dimensional pose 1110. For example, the pose search system 102 generates three-dimensional virtual joints for a three-dimensional virtual mannequin and places the three-dimensional virtual joints at the locations of the three-dimensional joints of the three-dimensional pose 1110 extracted from the digital image 1102.

Figure 12:
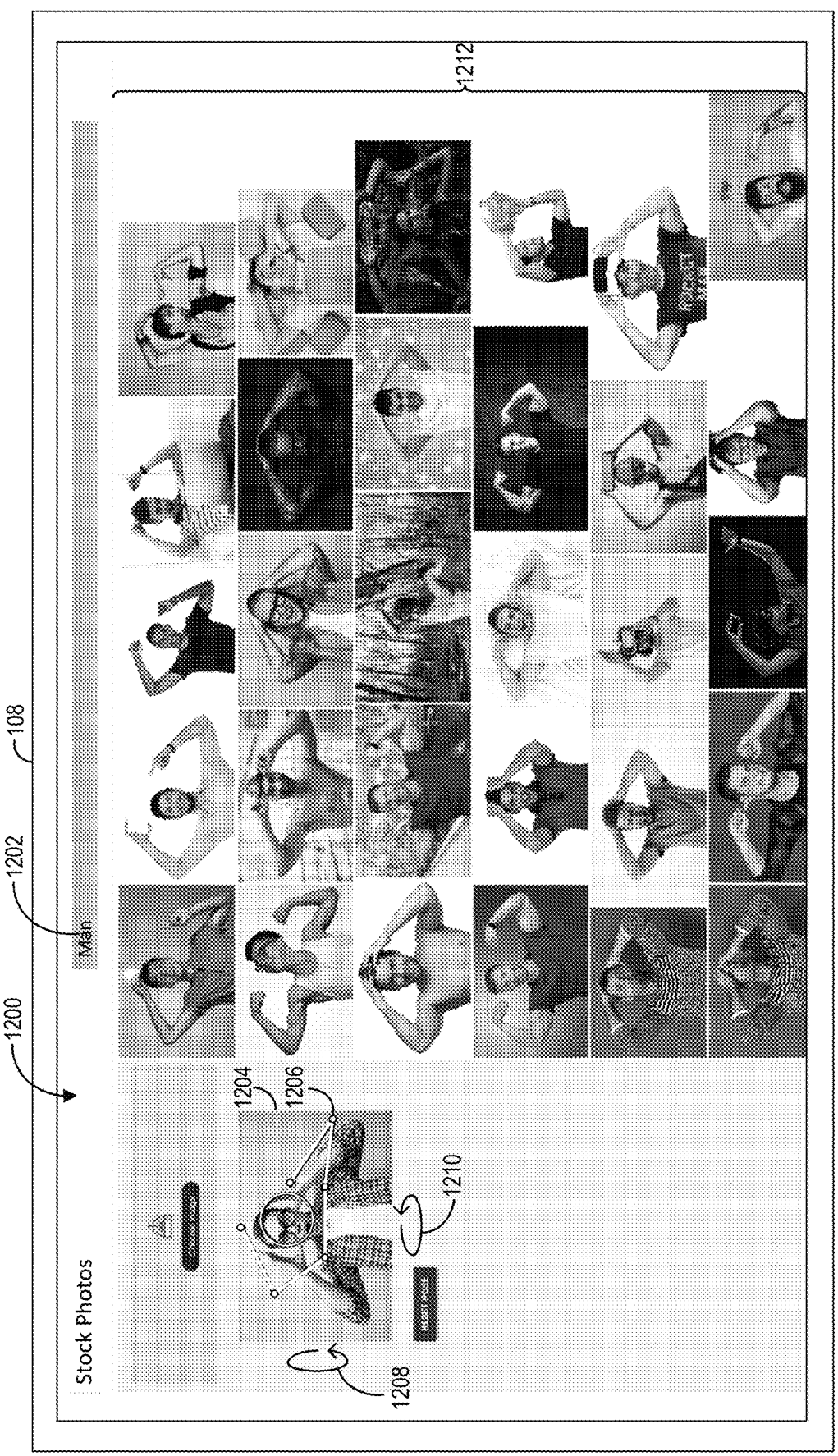
FIG. 12 illustrates an example digital image search interface including a three-dimensional virtual mannequin and a query response in accordance with one or more embodiments.

As mentioned, in certain embodiments, the pose search system 102 generates a digital image search interface that includes a three-dimensional virtual mannequin along with selectable controls or elements for manipulating a three-dimensional virtual mannequin. In particular, the pose search system 102 generates and provides a digital image search interface that includes a three-dimensional virtual mannequin, a keyword query, and a query response resulting from manipulation of the three-dimensional virtual mannequin. FIG. 12 illustrates a digital image search interface 1200 including a keyword query 1202, a three-dimensional virtual mannequin 1206, and a query response 1212.

As illustrated in FIG. 12, the pose search system 102 receives the keyword query 1202 ("man") and identifies digital images that depict digital content reflecting the keyword query 1202 (e.g., digital images portraying men). In addition (or alternatively), the pose search system 102 receives the digital image 1204 as an upload or as a selection from among the identified digital images corresponding to the keyword query 1202. The pose search system 102 further determines a three-dimensional pose from the digital image 1204 and generates a three-dimensional virtual mannequin 1206 from the three-dimensional pose. Additionally, the pose search system 102 receives user interaction to manipulate or modify the three-dimensional virtual mannequin 1206 to, for example, change a three-dimensional coordinate location of a virtual joint or segment. Based on the modification to the three-dimensional virtual mannequin 1206, the pose search system 102 generates and provides the query response 1212 including digital images of human figures in poses corresponding to the pose of the modified three-dimensional virtual mannequin 1206 (and depicting digital content reflecting the keyword query 1202).

In some embodiments, the pose search system 102 receives user interaction to manipulate or modify a viewing angle of the three-dimensional virtual mannequin 1206. In particular, the pose search system 102 receives or detects user interaction with a yaw control 1210 or a pitch control 1208. In response to user interaction with the yaw control 1210, the pose search system 102 modifies the viewing angle of the three-dimensional virtual mannequin 1206 by adjusting the yaw from side to side (e.g., for a more oblique viewing angle). Similarly, in response to user interaction with the pitch control 1208, the pose search system 102 modifies the viewing angle of the three-dimensional virtual mannequin 1206 by adjusting the pitch up and down (e.g., from a viewing angle from above the three-dimensional virtual mannequin 1206).

While FIG. 12 illustrates example viewing angle controls, additional or alternative controls are possible. For example, in some embodiments, the digital image search interface 1200 further includes a roll control that is selectable to modify the roll for the viewing angle. In the same or other embodiments, the digital image search interface 1200 includes a unit sphere around the three-dimensional virtual mannequin 1206 and that is selectable to change the viewing angle in any combination of pitch, roll, and yaw.

Based on modifications to the viewing angle, the pose search system 102 generates an updated query response. More specifically, the pose search system 102 searches for and identifies digital images depicting human figures in poses that not only correspond to the pose of the three-dimensional virtual mannequin, but that also have viewing angles corresponding to the indicated viewing angle. For example, if the pose search system 102 receives user interaction to modify the viewing angle to view the three-dimensional virtual mannequin 1206 from above, the pose search system 102 identifies digital images depicting human figures from above (and in poses matching the three-dimensional virtual mannequin 1206 and depicting digital content matching the keyword query 1202) to include within an updated query response.

In addition to modifying a viewing angle, the pose search system 102 further modifies the three-dimensional virtual mannequin 1206 in three dimensions. For example, the pose search system 102 receives user interaction to move a joint or a segment of the three-dimensional virtual mannequin 1206 in three dimensions (e.g., by changing an x-coordinate, a y-coordinate, and/or a z-coordinate). Based on receiving the user interaction to perform a three-dimensional manipulation of the three-dimensional virtual mannequin 1206, the pose search system 102 further determines a query pose (e.g., a three-dimensional query pose) of the three-dimensional virtual mannequin 1206. Further, the pose search system 102 identifies digital images depicting human figures in poses similar to the query pose and includes the digital images within a modified query response. In some cases, the pose search system 102 searches a database of three-dimensional images and provides three-dimensional images within the query response.

Figure 13:
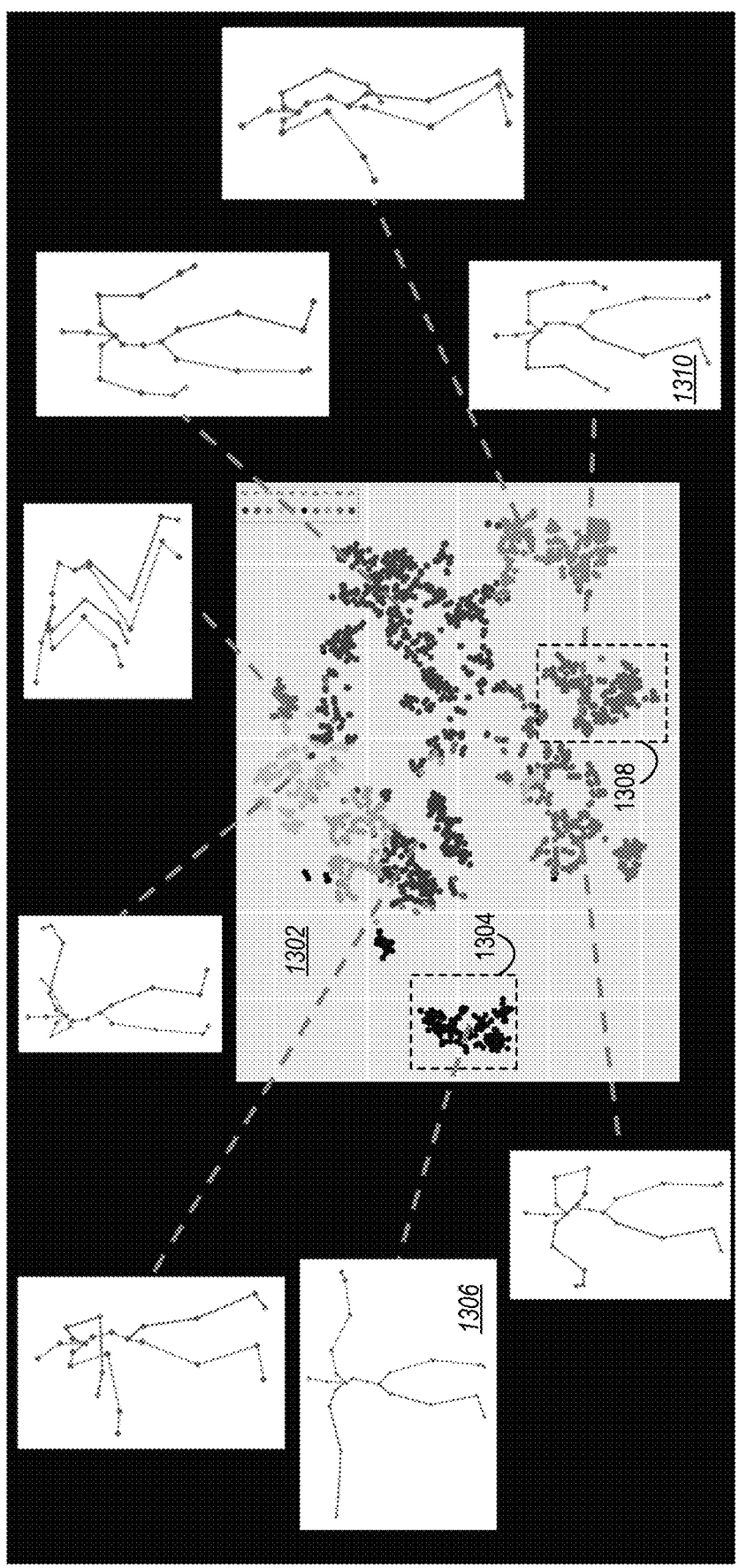
FIG. 13 illustrates example pose clusters in a pose feature space in accordance with one or more embodiments.

As mentioned above, in certain embodiments, the pose search system 102 determines poses based on generating pose vectors and comparing the pose vectors in a pose feature space. In some cases, the pose search system 102 also generates digital pose image groups by clustering pose vectors in the pose feature space. FIG. 13 illustrates an example pose feature space 1302 including a number of pose clusters in accordance with one or more embodiments.

As illustrated in FIG. 13, the pose search system 102 generates pose vectors for poses of human figures depicted in digital images. Indeed, the pose search system 102 utilizes a pose neural network to generate pose vectors and embed the pose vectors in the pose feature space 1302. As shown in FIG. 13, each pose vector is represented by a dot within the pose feature space 1302. In addition, the pose search system 102 determines distances between the pose vectors within the feature space 1302 and clusters the pose vectors in accordance with their respective distances from other pose vectors. In some cases, the pose search system 102 further clusters the pose vectors by identifying pose vectors within a threshold distance of each other (or from a cluster center) and grouping them together. For example, the pose search system 102 utilizes a clustering algorithm such as a k-means clustering algorithm, a mean-shift clustering algorithm, or an expectation-maximization clustering algorithm.

As shown in FIG. 13, for instance, the pose search system 102 generates a pose cluster 1304 and a pose cluster 1308. The pose search system 102 identifies additional pose clusters as well, each corresponding to a representative pose as illustrated. For example, the pose search system 102 determines a representative pose 1306 for the pose cluster 1304. Likewise, the pose search system 102 determines a representative pose 1310 for the pose cluster 1308. To determine the representative pose 1306, for instance, the pose search system 102 selects a particular pose vector from the pose cluster 1304. In some embodiments, the pose search system 102 determines a cluster center for the representative pose 1306. For example, the pose search system determines the centroid (geometric center of each cluster) as the cluster center and identify the digital image closest to the cluster center as a representative image. In one or more embodiments, the pose search system 102 determines an average of the pose vectors in each cluster as the cluster center and then selects one or more representative poses from the location of the average.

As mentioned, the pose search system 102 generates a digital pose image group based on clustering pose vectors. Indeed, the pose search system 102 generates a first digital pose image group including digital images corresponding to the pose vectors within the pose cluster 1304 and generates a second digital pose image group corresponding to the pose vectors within the pose cluster 1308. As also mentioned, the pose search system 102 selects a number of digital images from a digital pose image group to provide for display within a selectable element corresponding to the digital pose image group. For example, the pose search system 102 selects a number of pose vectors from the pose cluster 1304 by identifying a cluster center and selecting a number of nearest neighbor pose vectors from the cluster center (e.g., utilizing a nearest neighbor algorithm).

In some cases, the pose search system 102 selects a representative digital image corresponding to a representative pose vector from the pose cluster 1304 by, for example, identifying a pose vector that is closest to the cluster center. In certain embodiments, the pose search system 102 further generates a virtual mannequin for the representative digital image. For instance, the pose search system 102 determines a pose of the representative digital image and arranges joints and segments for the virtual mannequin according to the determined pose. The pose search system 102 further receives user interaction modifying the virtual mannequin, determines a query pose from the modified virtual mannequin, and identifies digital images depicting human figures in poses corresponding to the query pose.

Figure 14:
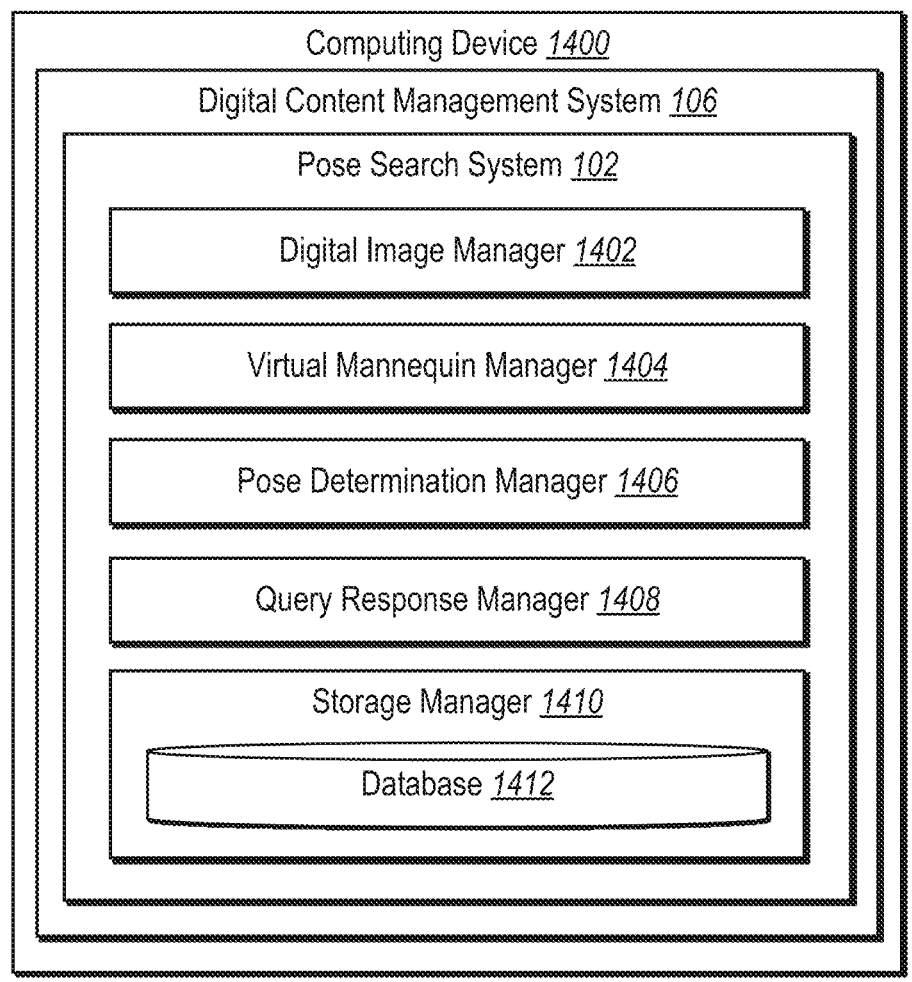
FIG. 14 illustrates a schematic diagram of a pose search system in accordance with one or more embodiments.

Looking now to FIG. 14, additional detail will be provided regarding components and capabilities of the pose search system 102. Specifically, FIG. 14 illustrates an example schematic diagram of the pose search system 102 on an example computing device 1400 (e.g., one or more of the client device 108 and/or the server(s) 104). As shown in FIG. 14, the pose search system 102 includes a digital image manager 1402, a virtual mannequin manager 1404, a pose determination manager 1406, a query response manager 1408, and a storage manager 1410.

As just mentioned, the pose search system 102 includes a digital image manager 1402. In particular, the digital image manager 1402 manages, maintains, stores, accesses, retrieves, or identifies digital images stored within a database. For example, the digital image manager 1402 communicates with the storage manager 1410 to access digital images stored within the database 1412. In some embodiments, the digital image manager 1402 identifies digital images based on a keyword query, a pose of selected/uploaded digital image, and/or a pose of virtual mannequin (two-dimensional or three-dimensional).

As illustrated in FIG. 14, the pose search system 102 includes a virtual mannequin manager 1404. In particular, the virtual mannequin manager 1404 manages, maintains, generates, accesses, modifies, manipulates, or updates a virtual mannequin. For example, the virtual mannequin manager 1404 generates a virtual mannequin based on a pose of a digital image. In addition, the virtual mannequin manager 1404 provides the virtual mannequin for display as an overlay superimposed on a human figure within a digital image (e.g., matching the pose of the human figure). In some embodiments, the virtual mannequin manager 1404 generates and provides a three-dimensional virtual mannequin. In one or more embodiments, the virtual mannequin manager 1404 modifies a virtual mannequin (two-dimensional or three-dimensional) based on user interaction to manipulate a joint, a segment, or a viewing angle.

As also illustrated in FIG. 14, the pose search system 102 includes a pose determination manager 1406. In particular, the pose determination manager 1406 determines, detects, generates, extracts, or otherwise identifies a pose from a digital image or from a virtual mannequin (two-dimensional or three-dimensional). For example, the pose determination manager 1406 utilizes a pose neural network to determine joint locations and segment locations for a human figure depicted within a digital image. In some embodiments, the pose determination manager 1406 further utilizes a 2D-to- 3D neural network to determine a three-dimensional pose from a two-dimensional pose of a digital image or a virtual mannequin.

Additionally, the pose search system 102 includes a query response manager 1408. In particular, the query response manager 1408 manages, maintains, generates, compiles, gathers, provides, presents, or otherwise identifies a query response. For example, the query response manager 1408 generates a query response by identifying digital images that correspond to a keyword query and/or that depict human figures in poses corresponding to a query pose identified from a digital image or from a virtual mannequin.

The pose search system 102 further includes a storage manager 1410. The storage manager 1410 operates in conjunction with or include one or more memory devices such as the database 1412 (e.g., the database 114) that store various data such as a repository of digital images, historical search queries and responses, and the neural networks described herein. The storage manager 1410 (e.g. via a non-transitory computer memory/one or more memory devices) stores and maintain data associated with determining poses, generating and presenting virtual mannequins, and generating query responses based on poses, keyword queries, and/or other input (e.g., within the database 1412).

In one or more embodiments, each of the components of the pose search system 102 are in communication with one another using any suitable communication technologies. Additionally, the components of the pose search system 102 is in communication with one or more other devices including one or more client devices described above. It will be recognized that although the components of the pose search system 102 are shown to be separate in FIG. 14, any of the subcomponents may be combined into fewer components, such as into a single component, or divided into more components as may serve a particular implementation. Furthermore, although the components of FIG. 14 are described in connection with the pose search system 102, at least some of the components for performing operations in conjunction with the pose search system 102 described herein may be implemented on other devices within the environment.

The components of the pose search system 102 can include software, hardware, or both. For example, the components of the pose search system 102 can include one or more instructions stored on a computer-readable storage medium and executable by processors of one or more computing devices (e.g., the computing device 1400). When executed by the one or more processors, the computer-executable instructions of the pose search system 102 can cause the computing device 1400 to perform the methods described herein. Alternatively, the components of the pose search system 102 can comprise hardware, such as a special purpose processing device to perform a certain function or group of functions. Additionally, or alternatively, the components of the pose search system 102 can include a combination of computer-executable instructions and hardware.

Furthermore, the components of the pose search system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the pose search system 102 may be implemented as part of a stand-alone application on a personal computing device or a mobile device. Alternatively, or additionally, the components of the pose search system 102 may be implemented in any application that allows creation and delivery of marketing content to users, including, but not limited to, applications in ADOBE® EXPERIENCE MANAGER and CREATIVE CLOUD®, such as ADOBE® STOCK, PHOTOSHOP®, and INDESIGN®. "ADOBE," "ADOBE EXPERIENCE MANAGER," "CREATIVE CLOUD," "ADOBE STOCK," "PHOTOSHOP," and "INDESIGN" are either registered trademarks or trademarks of Adobe Inc. in the United States and/or other countries.

FIGS. 1-14, the corresponding text, and the examples provide a number of different systems, methods, and non-transitory computer readable media for identifying and providing digital images corresponding to query poses and keyword queries and generating and providing pose image groups based on poses of digital images. In addition to the foregoing, embodiments can also be described in terms of flowcharts comprising acts for accomplishing a particular result. For example, FIGS. 15-16 illustrate flowcharts of example sequences or series of acts in accordance with one or more embodiments.

Figure 15:
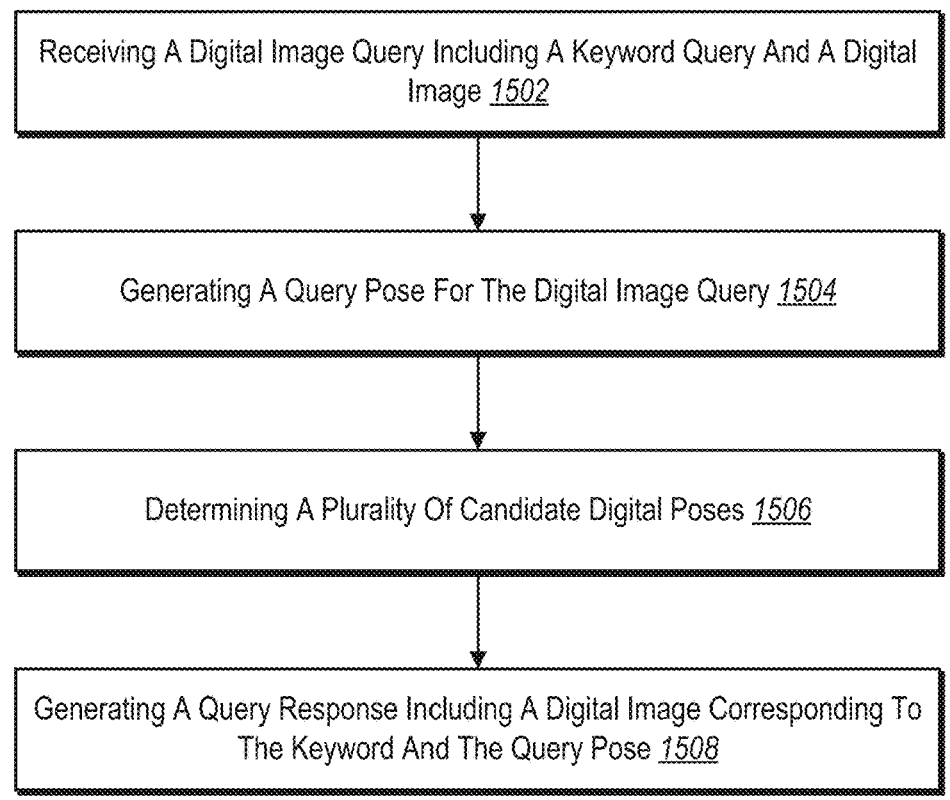
FIG. 15 illustrates a flowchart of a series of acts for identifying and providing digital images corresponding to query poses and keyword queries in accordance with one or more embodiments.
Figure 16:
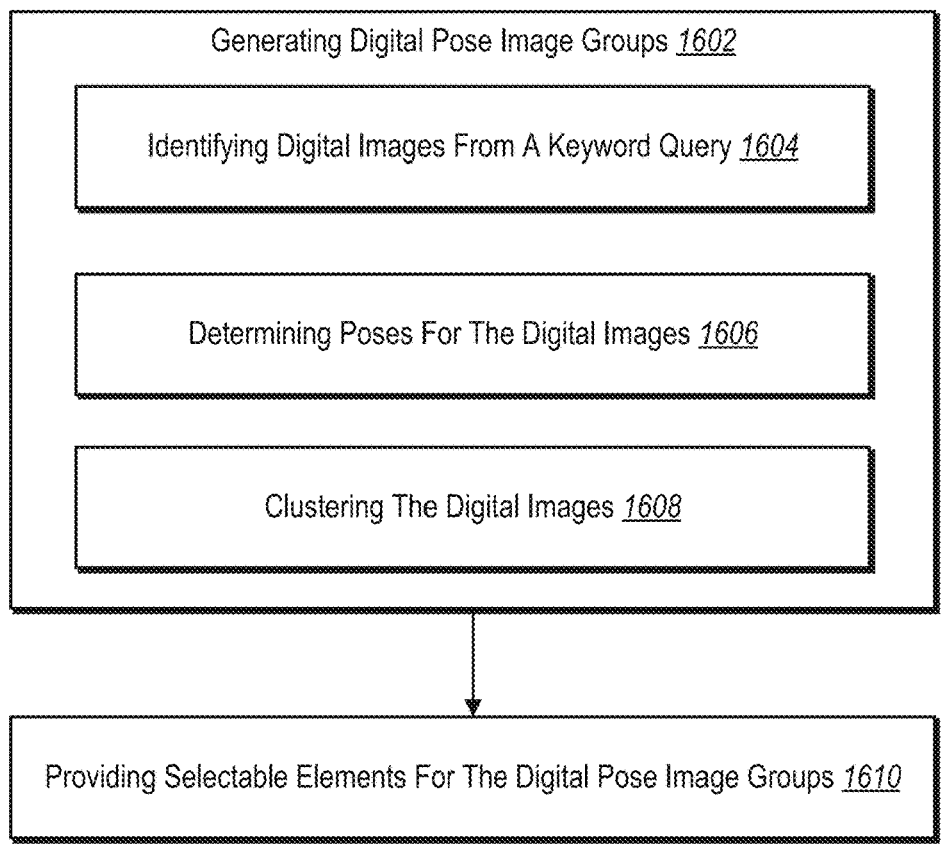
FIG. 16 illustrates a flowchart of a series of acts for generating and providing pose image groups based on poses of digital images in accordance with one or more embodiments.

While FIGS. 15-16 illustrate acts according to one embodiment, alternative embodiments may omit, add to, reorder, and/or modify any of the acts shown in FIGS. 15-16. The acts of FIGS. 15-16 can be performed as part of a method. Alternatively, a non-transitory computer readable medium can comprise instructions, that when executed by one or more processors, cause a computing device to perform the acts of FIGS. 15-16. In still further embodiments, a system can perform the acts of FIGS. 15-16. Additionally, the acts described herein may be repeated or performed in parallel with one another or in parallel with different instances of the same or other similar acts.

FIG. 15 illustrates an example series of acts 1500 of identifying and providing digital images corresponding to query poses and keyword queries. In particular, the series of acts 1500 includes an act 1502 of receiving a digital image query including a keyword query and a digital image. For example, the act 1502 involves receiving a digital image query including a keyword query and a digital image depicting a human figure.

As shown, the series of acts 1500 also includes an act 1504 of generating a query pose for the digital image query. In particular, the act 1504 involves generating a query pose from the human figure of the digital image utilizing a pose neural network. In these or other embodiments, the series of acts 1500 includes an act of identifying the plurality of digital images that include digital content reflecting the keyword query by comparing a keyword vector associated with the keyword query with label vectors associated with labels for digital content depicted within the plurality of digital images. In some cases, the act 1504 also involves utilizing the pose neural network to identify joint locations for the human figure of the digital image and extract a pose vector representing the joint locations for the human figure. In some embodiments, the act 1504 involves, in response to user selection of a digital image depicting a human figure, determining a query pose of the human figure by processing the digital image utilizing the pose neural network.

In certain embodiments, the act 1504 involves generating, utilizing the pose neural network, a two-dimensional query pose by extracting two-dimensional joint locations and two-dimensional segments from the human figure of the digital image. In addition, the act 1504 involves processing the two-dimensional query pose to generate a three-dimensional query pose utilizing a 2D-to-3D neural network.

In addition, the series of acts 1500 includes an act 1506 of determining a plurality of candidate digital poses. In particular, the act 1506 involves determining, utilizing the pose neural network, a plurality of candidate digital poses by processing a plurality of digital images from the repository of digital images that include digital content reflecting the keyword query. For example, the act 1506 involves identifying, from the repository of digital images, digital images depicting human figures with candidate digital poses corresponding to the query pose of the human figure.

As further shown, the series of acts 1500 includes an act 1508 of generating a query response including a digital image corresponding to the keyword query and the query pose. In particular, the act 1508 involves generating, by comparing the query pose from the digital image and the candidate digital poses from the plurality of digital images, a query response including a digital image from the plurality of digital images that depicts digital content reflecting the keyword query and that further depicts a human figure with a candidate digital pose corresponding to the query pose. In some cases, the act 1508 involves embedding pose vectors for the query pose and the candidate digital poses into a pose feature space and determining distances between the pose vectors within the pose feature space. The act 1508 further involves identifying a digital image that depicts digital content reflecting the keyword query and that further corresponds to a pose vector within a threshold distance of a pose vector of the query pose within the pose feature space.

In one or more embodiments, the series of acts 1500 includes an act of generating, for the digital image depicting the human figure, a virtual mannequin including manipulable joints and segments arranged according to the query pose. In some cases, the series of acts 1500 includes an act of providing the virtual mannequin for display with the digital image via a user interface. In at least one embodiment, the series of acts 1500 includes an act of, based on user interaction with the virtual mannequin, generating a modified virtual mannequin including at least one of a modified joint or a modified segment. Indeed, the series of acts 1500 includes an act of generating a modified virtual mannequin including one or more of a modified joint or a modified segment arranged according to a modified query pose.

In some cases, the series of acts 1500 includes an act of generating a three-dimensional virtual mannequin arranged according to the three-dimensional query pose. In addition, the series of acts 1500 includes acts of providing the three-dimensional virtual mannequin for display as an overlay superimposed on top of the digital image depicting the human figure, receiving an indication of user interaction to manipulate a viewing angle associated with the three-dimensional virtual mannequin, and modifying the viewing angle in accordance with the user interaction.

The series of acts 1500 also includes acts of determining a modified query pose from the modified virtual mannequin and comparing the modified query pose and the candidate digital poses from the plurality of digital images to generate a modified query response including an additional digital image from the plurality of digital images that depicts digital content reflecting the keyword query and that further depicts an additional human figure with an additional candidate digital pose corresponding to the modified query pose. Indeed, the series of acts 1500 includes an act of identifying, from the repository of digital images, digital images depicting human figures with candidate digital poses corresponding to the modified query pose of the modified virtual mannequin.

In certain embodiments, the series of acts 1500 includes an act of generating, from the query pose, a three-dimensional query pose utilizing a 2D-to-3D neural network and further includes acts of generating a three-dimensional virtual mannequin including manipulable joints and segments arranged according to the three-dimensional query pose and providing the three-dimensional virtual mannequin for display with the digital image via a user interface. In some embodiments, the series of acts 1500 includes an act of providing, for display within a user interface via a client device, the virtual mannequin and the digital images depicting human figures with candidate digital poses corresponding to the query pose the digital pose images.

In one or more embodiments, the series of acts 1500 includes an act of generating a digital image query including a keyword query and the modified query pose of the modified virtual mannequin. Further, the series of acts 1500 includes an act of identifying, from the repository of digital images, digital images depicting digital content reflecting the keyword query and further depicting human figures with candidate digital poses corresponding to the modified query pose of the modified virtual mannequin.

FIG. 16 illustrates an example series of acts 1600 of generating and providing pose image groups based on poses of digital images. In particular, the series of acts 1600 includes an act 1602 of generating digital pose image groups.

The act 1602 includes additional acts such as an act 1604 of identifying digital images from a keyword query. In particular, the act 1604 involves identifying, from a repository of digital images, a plurality of digital images portraying digital content corresponding to the keyword query and depicting human figures.

The act 1602 also includes an act 1606 of determining poses for the digital images. In particular, the act 1606 involves determining poses for the plurality of digital images depicting human figures from the repository of digital images. For example, the act 1606 involves utilizing a pose neural network to extract joint locations for the human figures within the plurality of digital images.

The act 1602 further includes an act 1608 of clustering the digital images. In particular, the act 1608 involves clustering the plurality of digital images into digital pose image groups according to the determined poses. For example, the act 1608 involves embedding pose vectors corresponding to the determined poses for the plurality of digital images into a pose feature space and grouping embedded pose vectors together within the pose feature space in accordance with distances between the embedded pose vectors.

In addition, the series of acts 1600 includes an act 1610 of providing selectable elements for the digital pose image groups. In particular, the act 1610 involves providing, for display via a client device, selectable elements corresponding to the digital pose image groups and the keyword query. For example, the act 1610 involves determining a cluster center for a first pose image group of the pose image groups within the pose feature space and providing a digital image corresponding to the cluster center for display via the client device.

In some embodiments, the series of acts 1600 includes an act of identifying a representative digital image for a digital pose image group. In addition, the series of acts 1600 includes acts of generating a virtual mannequin comprising manipulable joints and sections arranged in accordance with a pose corresponding to the representative digital image and providing the virtual mannequin for display via the client device. Further, the series of acts 1600 includes an act of receiving user interaction to generate a query pose for the virtual mannequin by modifying one or more of the manipulable joints or segments of the virtual mannequin. In addition, the series of acts 1600 includes an act of identifying, from the repository of digital images, one or more digital images depicting human figures with poses corresponding to the query pose of the virtual mannequin.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
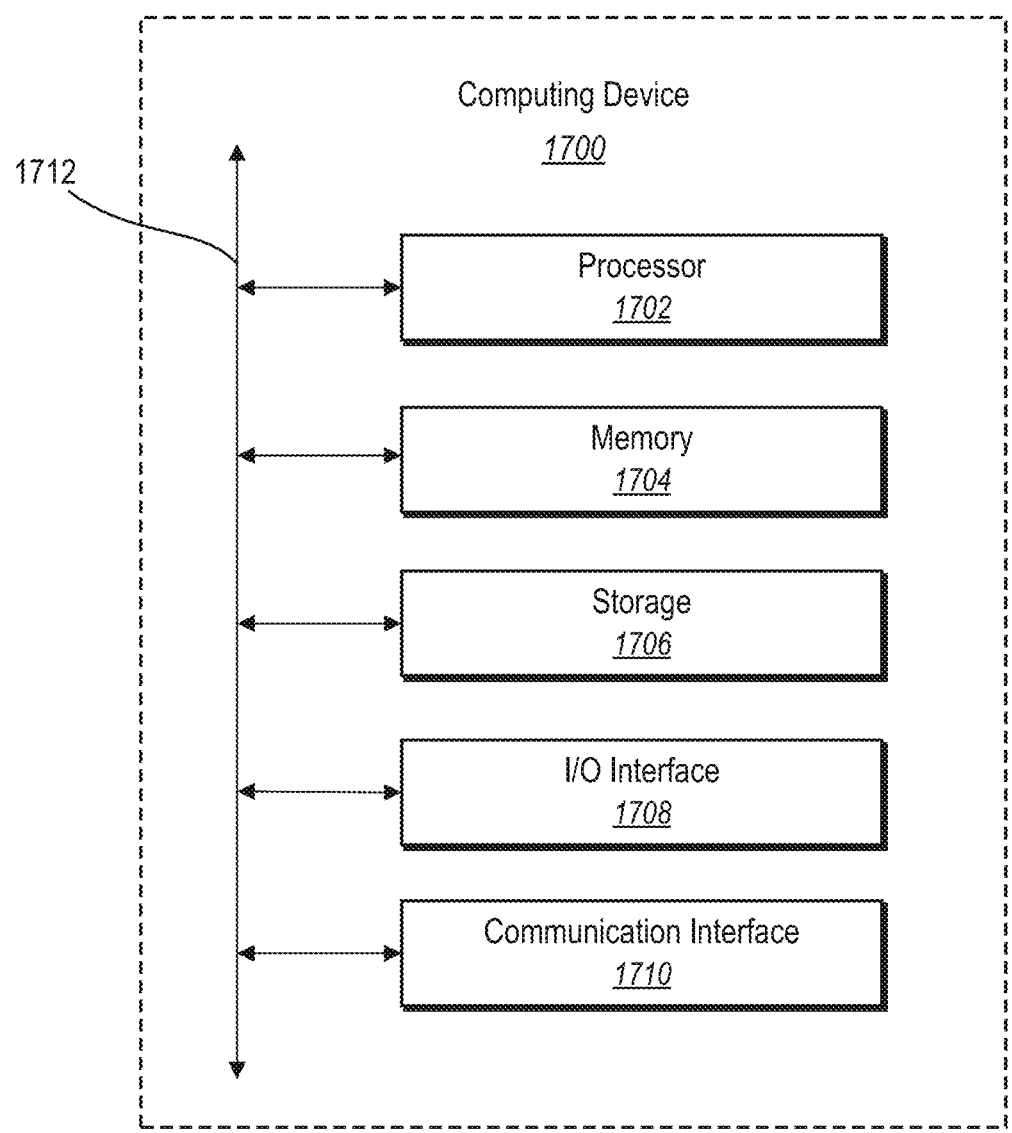
FIG. 17 illustrates a block diagram of an example computing device in accordance with one or more embodiments.

FIG. 17 illustrates, in block diagram form, an example computing device 1700 (e.g., the computing device 1400, the client device 108, and/or the server(s) 104) that may be configured to perform one or more of the processes described above. One will appreciate that the pose search system 102 can comprise implementations of the computing device 1700. As shown by FIG. 17, the computing device can comprise a processor 1702, memory 1704, a storage device 1706, an I/O interface 1708, and a communication interface 1710. Furthermore, the computing device 1700 can include an input device such as a touchscreen, mouse, keyboard, etc. In certain embodiments, the computing device 1700 can include fewer or more components than those shown in FIG. 17. Components of computing device 1700 shown in FIG. 17 will now be described in additional detail.

In particular embodiments, processor(s) 1702 includes hardware for executing instructions, such as those making up a computer program. As an example, and not by way of limitation, to execute instructions, processor(s) 1702 may retrieve (or fetch) the instructions from an internal register, an internal cache, memory 1704, or a storage device 1706 and decode and execute them.

The computing device 1700 includes memory 1704, which is coupled to the processor(s) 1702. The memory 1704 may be used for storing data, metadata, and programs for execution by the processor(s). The memory 1704 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1704 may be internal or distributed memory.

The computing device 1700 includes a storage device 1706 includes storage for storing data or instructions. As an example, and not by way of limitation, storage device 1706 can comprise a non-transitory storage medium described above. The storage device 1706 may include a hard disk drive (HDD), flash memory, a Universal Serial Bus (USB) drive or a combination of these or other storage devices.

The computing device 1700 also includes one or more input or output ("I/O") devices/interfaces 1708, which are provided to allow a user to provide input to (such as user strokes), receive output from, and otherwise transfer data to and from the computing device 1700. These I/O devices/interfaces 1708 may include a mouse, keypad or a keyboard, a touch screen, camera, optical scanner, network interface, modem, other known I/O devices or a combination of such I/O devices/interfaces 1708. The touch screen may be activated with a writing device or a finger.

The I/O devices/interfaces 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1708 is configured to provide graphical data to a display for presentation to a user. The graphical data may be representative of one or more graphical user interfaces and/or any other graphical content as may serve a particular implementation.

The computing device 1700 can further include a communication interface 1710. The communication interface 1710 can include hardware, software, or both. The communication interface 1710 can provide one or more interfaces for communication (such as, for example, packet-based communication) between the computing device and one or more other computing devices 1700 or one or more networks. As an example, and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI. The computing device 1700 can further include a bus 1712. The bus 1712 can comprise hardware, software, or both that couples components of computing device 1700 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method for generating and providing pose-based search interfaces, the computer-implemented method comprising:
   providing, for display within a digital image search interface, a keyword query element for entering a keyword query and a digital image element for selecting a query image depicting a human figure;
   generating a query pose from the human figure of the query image utilizing a pose neural network;
   determining, utilizing the pose neural network, a plurality of candidate digital poses by processing a plurality of digital images from a repository of digital images that include digital content reflecting the keyword query;
   generating, by comparing the query pose from the query image and candidate digital poses from the plurality of digital images, a query response comprising a digital image from the plurality of digital images that depicts digital content reflecting the keyword query and that further depicts a human figure with a candidate digital pose corresponding to the query pose; and
   providing the query response for display within the digital image search interface together with the keyword query element and the digital image element.

2. The computer-implemented method of claim 1, further comprising: generating, for the query image depicting the human figure, a virtual mannequin comprising manipulable joints and segments arranged according to the query pose; and providing the virtual mannequin for display within the digital image search interface.

3. The computer-implemented method of claim 2, further comprising:
   based on user interaction with the virtual mannequin, generating a modified virtual mannequin comprising at least one of a modified joint or a modified segment;
   determining a modified query pose from the modified virtual mannequin; and
   comparing the modified query pose and the candidate digital poses from the plurality of digital images to generate a modified query response comprising an additional digital image from the plurality of digital images that depicts digital content reflecting the keyword query and that further depicts an additional human figure with an additional candidate digital pose corresponding to the modified query pose.

4. The computer-implemented method of claim 1, wherein comparing the query pose and the candidate digital poses comprises:
   embedding pose vectors for the query pose and the candidate digital poses into a pose feature space; and
   determining distances between the pose vectors within the pose feature space.

5. The computer-implemented method of claim 4, wherein generating the query response comprises identifying a digital image that depicts digital content reflecting the keyword query and that further corresponds to a pose vector within a threshold distance of a pose vector of the query pose within the pose feature space.

6. The computer-implemented method of claim 2, further wherein generating the virtual mannequin comprises:
   generating, from the query pose, a three-dimensional query pose utilizing a 2D-to-3D neural network; and
   generating a three-dimensional virtual mannequin comprising manipulable joints and segments arranged according to the three-dimensional query pose; and
   further comprising providing the three-dimensional virtual mannequin for display with the query image via the digital image search interface.

7. The computer-implemented method of claim 1, further comprising:
   identifying the plurality of digital images that include digital content reflecting the keyword query by comparing a keyword vector associated with the keyword query with label vectors associated with labels for digital content depicted within the plurality of digital images; and
   wherein generating the query pose from the human figure of the query image comprises utilizing the pose neural network to:
      identify joint locations for the human figure of the query image; and
      extract a pose vector representing the joint locations for the human figure.

8. A system comprising:
   one or more memory devices comprising a repository of digital images and a pose neural network; and
   one or more computing devices configured to cause the system to:
      in response to user selection of a digital image depicting a human figure, determine a query pose of the human figure by processing the digital image utilizing the pose neural network;
      utilize the query pose to generate, for the digital image depicting the human figure, a virtual mannequin comprising manipulable joints and segments arranged according to the query pose;
      based on user interaction modifying one or more manipulable joints or segments of the virtual mannequin, generate a modified query pose reflecting modifications to the virtual mannequin;
      identify, from the repository of digital images, digital images depicting human figures with candidate digital poses corresponding to the modified query pose of the virtual mannequin; and
      provide, for display within a user interface via a client device, the virtual mannequin and the digital images depicting human figures with candidate digital poses corresponding to the modified query pose.

9. The system of claim 8, wherein the one or more computing devices are further configured to cause the system to:
   receive an indication of the user interaction with the virtual mannequin via the user interface; and
   in response to the user interaction, generate a modified virtual mannequin comprising one or more of a modified joint or a modified segment arranged according to the modified query pose.

10. The system of claim 8, wherein the one or more computing devices are further configured to cause the system to determine the query pose by extracting pose vectors representing joint locations of the human figure utilizing the pose neural network.

11. The system of claim 8, wherein the one or more computing devices are further configured to cause the system to:
   generate a digital image query comprising a keyword query and the modified query pose of the virtual mannequin; and
   identify, from the repository of digital images, digital images depicting digital content reflecting the keyword query and further depicting human figures with candidate digital poses corresponding to the modified query pose of the virtual mannequin.

12. The system of claim 8, wherein the one or more computing devices are further configured to cause the system to determine the query pose by:
   generating, utilizing the pose neural network, a two-dimensional query pose by extracting two-dimensional joint locations and two-dimensional segments from the human figure of the digital image; and
   processing the two-dimensional query pose to generate a three-dimensional query pose utilizing a 2D-to-3D neural network.

13. The system of claim 12, wherein the one or more computing devices are further configured to cause the system to generate the virtual mannequin by generating a three-dimensional virtual mannequin arranged according to the three-dimensional query pose.

14. The system of claim 13, wherein the one or more computing devices are further configured to cause the system to:
   provide the three-dimensional virtual mannequin for display as an overlay superimposed on top of the digital image depicting the human figure;
   receive an indication of user interaction to manipulate a viewing angle associated with the three-dimensional virtual mannequin; and
   modify the viewing angle in accordance with the user interaction.

15. A non-transitory computer readable medium comprising instructions that, when executed by at least one processor, cause a computing device to:
   in response to receiving a keyword query, generate a plurality of digital pose image groups by:
      identifying, from a repository of digital images, a plurality of digital images portraying digital content corresponding to the keyword query and depicting human figures;
      determining poses for the plurality of digital images depicting human figures from the repository of digital images; and
      clustering the plurality of digital images into digital pose image groups by comparing pose vectors of the determined poses of the human figures; and provide, for display via a client device, selectable elements corresponding to the digital pose image groups and the keyword query.

16. The non-transitory computer readable medium of claim 15, further comprising instructions that, when executed by the at least one processor, cause the computing device to determine the poses for the plurality of digital images depicting human figures by utilizing a pose neural network to extract joint locations for the human figures within the plurality of digital images.

17. The non-transitory computer readable medium of claim 15, further comprising instructions that, when executed by the at least one processor, cause the computing device to cluster the plurality of digital images depicting human figures into digital image pose groups by:

embedding the pose vectors corresponding to the determined poses for the plurality of digital images into a pose feature space; and grouping embedded pose vectors together within the pose feature space in accordance with distances between the embedded pose vectors.

18. The non-transitory computer readable medium of claim 17, further comprising instructions that, when executed by the at least one processor, cause the computing device to provide, for display via the client device, the selectable elements corresponding to the digital pose image groups by:

determining a cluster center for a first pose image group of the digital pose image groups within the pose feature space; and providing a digital image corresponding to the cluster center for display via the client device.

19. The non-transitory computer readable medium of claim 15, further comprising instructions that, when executed by the at least one processor, cause the computing device to:

identify a representative digital image for a digital pose image group;

generate a virtual mannequin comprising manipulable joints and sections arranged in accordance with a pose corresponding to the representative digital image; and provide the virtual mannequin for display via the client device.

20. The non-transitory computer readable medium of claim 19, further comprising instructions that, when executed by the at least one processor, cause the computing device to:

receive user interaction to generate a query pose for the virtual mannequin by modifying one or more of the manipulable joints or segments of the virtual mannequin; and identify, from the repository of digital images, one or more digital images depicting human figures with poses corresponding to the query pose of the virtual mannequin.

* * * * *